US012791194B2

(12) United States Patent
Tanaka et al.

(10) Patent No.: US 12,791,194 B2
(45) Date of Patent: Nov. 10, 2026

(54) HEATER UNIT, HEATER STRUCTURE, AND HEATING COOKER

(71) Applicant: Shinpo Co., Ltd., Nagoya (JP)

(72) Inventors: Toshiaki Tanaka, Seto (JP); Yukio Kato, Komaki (JP)

(73) Assignee: Shinpo Co., Ltd., Nagoya (JP)

(*) Notice: Subject to any disclaimer, the term of this patent is extended or adjusted under 35 U.S.C. 154(b) by 1050 days.

(21) Appl. No.: 17/954,317

(22) Filed: Sep. 27, 2022

(65) Prior Publication Data

US 2023/0408102 A1 Dec. 21, 2023

(30) Foreign Application Priority Data

Jun. 20, 2022 (JP) ................................ 2022-098637

(51) Int. Cl.
*F24C 7/06* (2006.01)
*F24C 15/36* (2006.01)
*H05B 3/40* (2006.01)

(52) U.S. Cl.
CPC ................ *F24C 7/06* (2013.01); *F24C 15/36* (2013.01); *H05B 3/40* (2013.01)

(58) Field of Classification Search
CPC ......... A47J 37/0676; F24C 15/36; F24C 7/06; F24C 7/067; H05B 3/40; H05B 3/44; H05B 3/68
USPC ........................................................ 219/402
See application file for complete search history.

(56) References Cited

U.S. PATENT DOCUMENTS

| | | | | |
|---|---|---|---|---|
| 4,042,806 A * | 8/1977 | McCartney | ......... | F24C 15/2042 219/400 |
| 4,862,795 A * | 9/1989 | Hawkins | ............. | A47J 37/0709 D7/346 |
| 5,151,040 A * | 9/1992 | Tanaka | ................. | H01R 13/187 439/700 |
| 5,287,799 A * | 2/1994 | Pickering | ............ | F24C 15/2042 126/211 |
| 2003/0111456 A1* | 6/2003 | Arntz | .................. | F24C 15/2042 219/452.12 |
| 2022/0320796 A1* | 10/2022 | Zhang | ................ | H01R 13/6277 |

FOREIGN PATENT DOCUMENTS

| | | |
|---|---|---|
| CN | 105725846 | 7/2016 |
| JP | 9-178193 | 7/1997 |
| JP | 2011-153722 | 8/2011 |
| JP | 2021-110509 | 8/2021 |

OTHER PUBLICATIONS

Extended European Search Report dated Jul. 21, 2023, in EP Patent Application No. 22197296.1, 9 pages.

* cited by examiner

*Primary Examiner* — Sang Y Paik
(74) *Attorney, Agent, or Firm* — Lowe Graham Jones PLLC

(57) ABSTRACT

A heater unit includes a first terminal; and a resistance heating type heater electrically connected to the first terminal.

13 Claims, 28 Drawing Sheets

HEATER UNIT, HEATER STRUCTURE, AND HEATING COOKER

PRIORITY CLAIM

This application claims the benefit of Japan Patent Application No. 2022-098637, filed Jun. 20, 2022, the contents of which are incorporated herein by reference.

FIELD OF THE INVENTION

The present invention relates to a heater unit including a resistance heating type heater, a heater structure including the heater unit, and a heating cooker including the heater structure.

BACKGROUND OF THE INVENTION

As a heat source of a heating cooker for baking and cooking a food material, a gas burner is mainly used. However, for example, in a high-rise building, use of an electric heater is sometimes desired from the viewpoint of disaster prevention. A heating cooker equipped with an electric heater is disclosed in, for example, JP H9-178193 A.

SUMMARY OF THE INVENTION

Since the electric heater becomes dirty by oil or the like falling from the food material, the electric heater needs to be cleaned periodically. In cleaning the electric heater, it is desirable to easily clean the electric heater.

An object of the present invention is to provide a heater unit that includes a resistance heating type heater and is easy to clean. An object of the present invention is also to provide a heater structure including the heater unit. Furthermore, another object of the present invention is to provide a heating cooker including the heater structure.

The present invention provides inventions of the following aspects.

Item 1

A heater unit for a heating cooker, the heater unit including:

- a first terminal; and
- a resistance heating type heater electrically connected to the first terminal.

Item 2

The heater unit according to item 1, where a shape of the heater is a rod shape.

Item 3

The heater unit according to item 2, where the shape of the heater is a circular column shape.

Item 4

The heater unit according to any one of items 1 to 3, where a top view and a bottom view of the heater unit are the same.

Item 5

A heater structure for a heating cooker, the heater structure including:

- the heater unit according to any one of items 1 to 4; and
- a connector unit including a second terminal configured to be electrically connected to a power supply, the second terminal having a contact surface configured to come into contact with the first terminal, and the connector unit being relatively movable with respect to the first terminal, where

- the heater unit and/or the connector unit further includes a coupling member that detachably couples the heater unit and the connector unit, and
- the heater unit or the connector unit further includes a first elastic member that, when one of the first terminal and the second terminal is pushed by the other terminal, presses the one toward the other.

Item 6

The heater structure according to item 5, where the contact surface is a concave curved surface, and

- a portion of the first terminal that comes into contact with the contact surface is smaller than the contact surface.

Item 7

The heater structure according to item 5 or 6, where the heater unit can be inverted upside down and coupled to the connector unit.

Item 8

The heater structure according to any one of items 5 to 7, where

- the heater unit further includes a heater casing in which the first terminal is disposed,
- the connector unit further includes a connector casing capable of being installed in the heating cooker and in which the second terminal is disposed,
- the coupling member is a permanent magnet disposed in at least one of the heater casing and the connector casing,
- at least the other of the heater casing and the connector casing is made of a magnetic material, and
- the heater unit and the connector unit are coupled by the heater casing and the connector casing adhering by magnetic force of the permanent magnet.

Item 9

The heater structure according to item 8, where

- the heater unit further includes a first insulator disposed in the heater casing, and the first terminal is fixed to the first insulator,
- the connector unit further includes a second insulator disposed in the connector casing,
- the second terminal includes a first portion having the contact surface and a second portion integrally formed on a side opposite to the contact surface and having a diameter smaller than a diameter of the first portion,
- the second insulator includes a first through hole into which the first portion is insertable and a second through hole having a diameter smaller than a diameter of the first portion and into which the second portion is insertable,
- the first portion is disposed in the first through hole, and the second portion extends through the first through hole and the second through hole,
- a first elastic member is disposed in the first through hole and between the first portion and a wall portion of the second insulator, and
- when the second terminal is pushed in by the first terminal, the first elastic member is compressed between the first portion and the wall portion of the second insulator, and the second terminal is pressed toward the first terminal by a restoring force of the compressed first elastic member.

Item 10

A heating cooker including the heater structure according to any one of items 5 to 9.

Item 11

The heating cooker according to item 10, including:

- an outer casing; and
- an inner casing accommodated in the outer casing, where the outer casing includes a side wall having a first opening, the inner casing includes a side wall having a second opening at a position facing the first opening, the connector unit is immovably fixed to an outer surface of the side wall of the outer casing, the contact surface of the second terminal is exposed through the first opening and the second opening, and the heater unit is inserted into the first opening and the second opening from an inside of the inner casing, and is coupled to the connector unit.

Item 12

The heating cooker according to item 10, including:

an outer casing;

an inner casing accommodated in the outer casing; and a shaft member, where the outer casing includes a side wall having a first opening, the inner casing includes a side wall having a second opening at a position facing the first opening, the coupling member is a permanent magnet disposed in at least one of the heater casing and the connector casing, at least the other of the heater casing and the connector casing is made of a magnetic material, the heater unit and the connector unit are coupled by the heater casing and the connector casing adhering by a magnetic force of the permanent magnet, the connector unit is turnably connected to an outer surface of the side wall of the outer casing by the shaft member, the contact surface of the second terminal is exposed through the first opening and the second opening, and the heater unit is inserted into the first opening and the second opening from an inside of the inner casing, and is coupled to the connector unit.

Item 13

The heating cooker according to item 12, further including a second elastic member that biases the connector unit toward the outer casing.

Item 14

The heating cooker according to any one of items 10 to 13, further comprising a reflection member that reflects heat radiated from the heater, where at least a part of the reflection member is disposed below the heater.

Item 15

The heating cooker according to item 14, where the heater unit includes two heaters separated from each other, and the reflection member includes two trough portions disposed below the two heaters and a crest portion provided between the two trough portions.

Item 16

The heating cooker according to any one of items 10 to 15, further including a heater cover that prevents adhesion of dirt to the heater unit.

Since the heater unit of the present invention is unitized and detachable from the heating cooker, the heater unit can be detached and the heater unit alone can be cleaned. This simplifies the cleaning of the heater unit.

BRIEF DESCRIPTION OF THE DRAWINGS

Preferred and alternative examples of the present invention are described in detail below with reference to the following drawings.

FIGS. 1 to 13B are diagrams illustrating a heater structure and a heating cooker according to a first embodiment of the present invention.

FIGS. 14A to 16 are diagrams illustrating a heater structure and a heating cooker according to a second embodiment of the present invention.

FIG. 1 is a perspective view of a heating cooker installed on a table;

FIG. 2 is an assembly perspective view of the heating cooker;

FIG. 3 is an exploded perspective view of the heating cooker;

FIG. 4 is a cross-sectional view taken along line Iv-Iv of FIG. 2;

FIG. 7 is a perspective view illustrating the inside of the outer casing after the inner casing is installed in an outer casing;

FIG. 8 is a perspective view illustrating the inside of the outer casing after a heater unit is installed;

FIG. 10 is a perspective view of a heater unit to which a heater cover is attached;

FIG. 11 is an exploded perspective view of the connector unit;

FIG. 13B is a cross-sectional view after the heater unit and the connector unit are coupled;

FIG. 14A is a perspective view of the connector unit and the outer casing before the connector unit is installed in the outer casing;

FIG. 16 is a cross-sectional view for explaining a method of detaching the heater unit from the connector unit;

FIG. 17 is a perspective view of the heater unit;

FIG. 18 is a perspective view of a reflection member; and

FIG. 19 is a side view illustrating a positional relationship between the heater and the reflection member.

DETAILED DESCRIPTION OF THE PREFERRED EMBODIMENT

A heater structure and a heating cooker according to the present invention will be described with reference to the drawings. The embodiment described below shows a preferred specific example of the present invention. The present invention is not limited to the following embodiments, and can be appropriately modified within a scope not deviating from the gist thereof. For clarity, hatching may be omitted in the cross-sectional view.

A. First Embodiment

A heating cooker 100 and a heater structure 5 according to a first embodiment will be described.

A.1 Overall Structure of Heating Cooker

Figure 1:
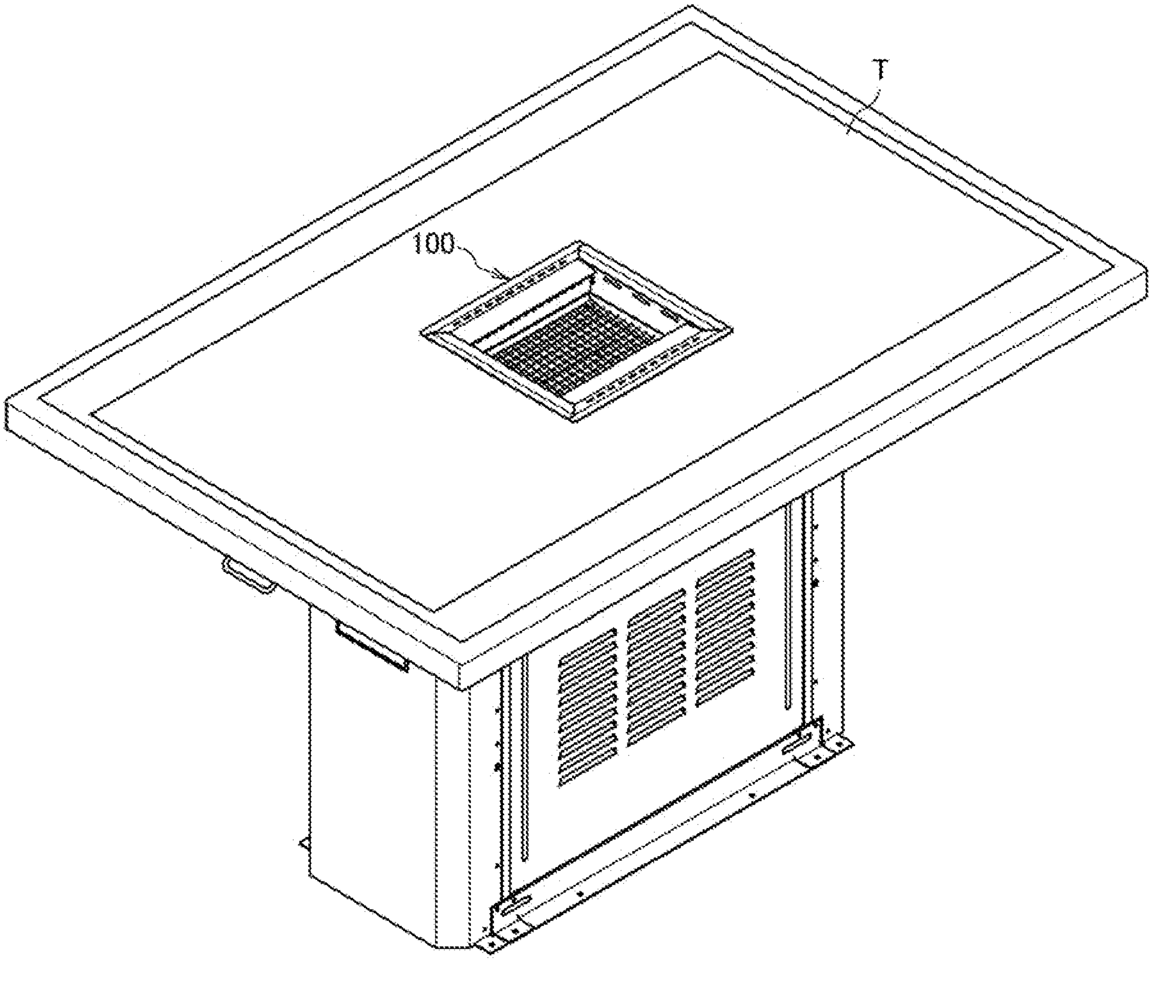
Figure 2:
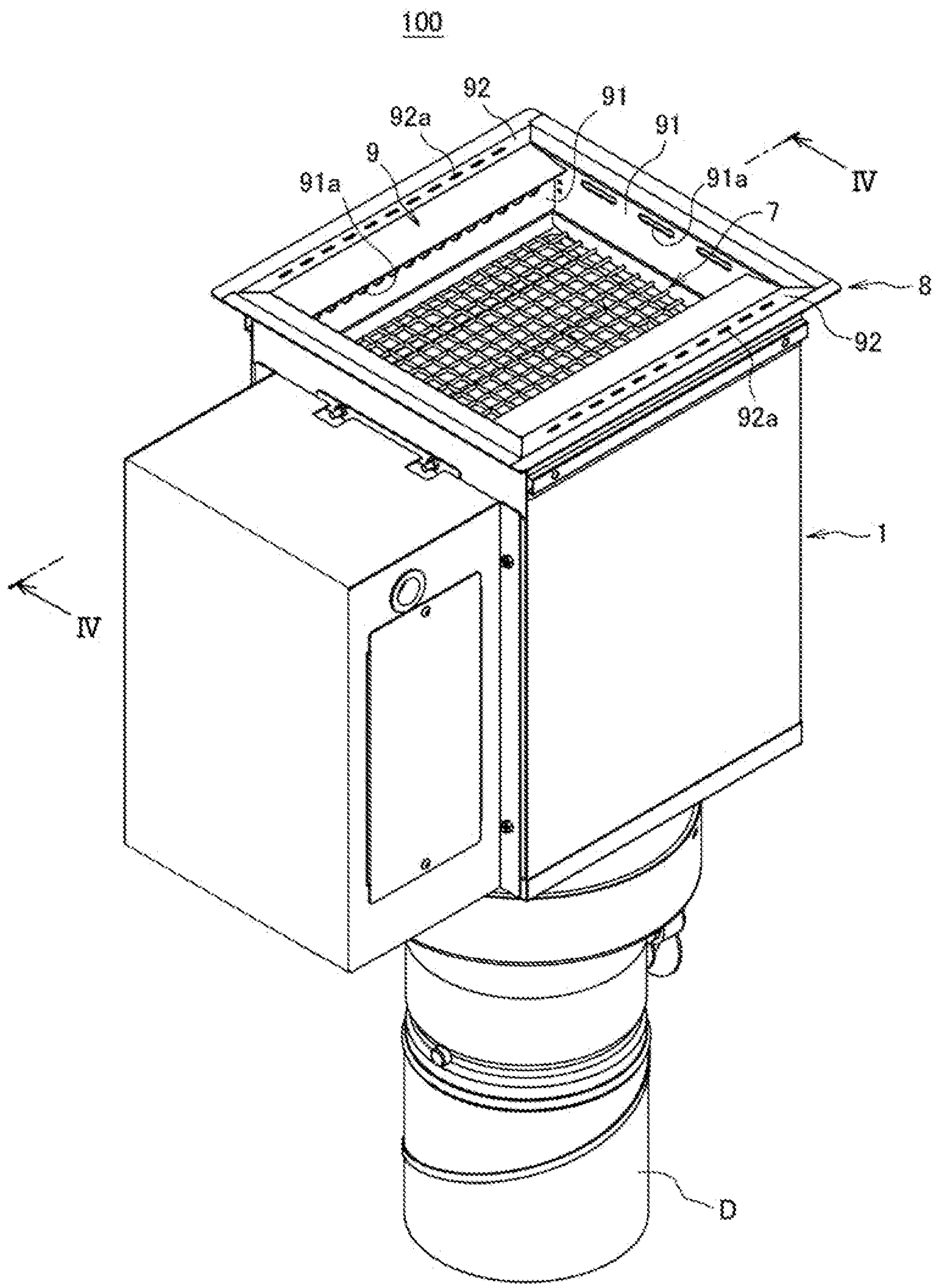
Figure 3:
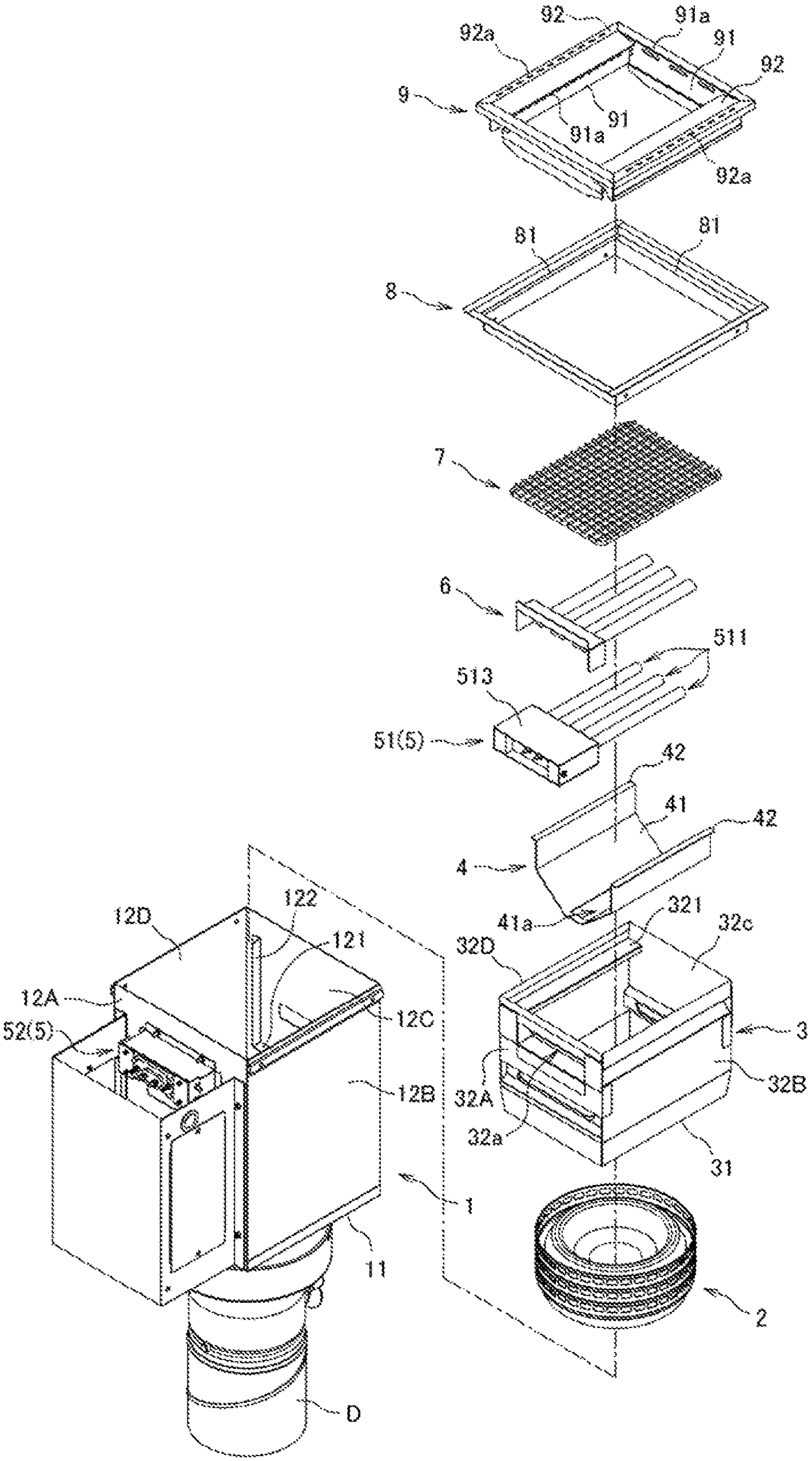
Figure 4:
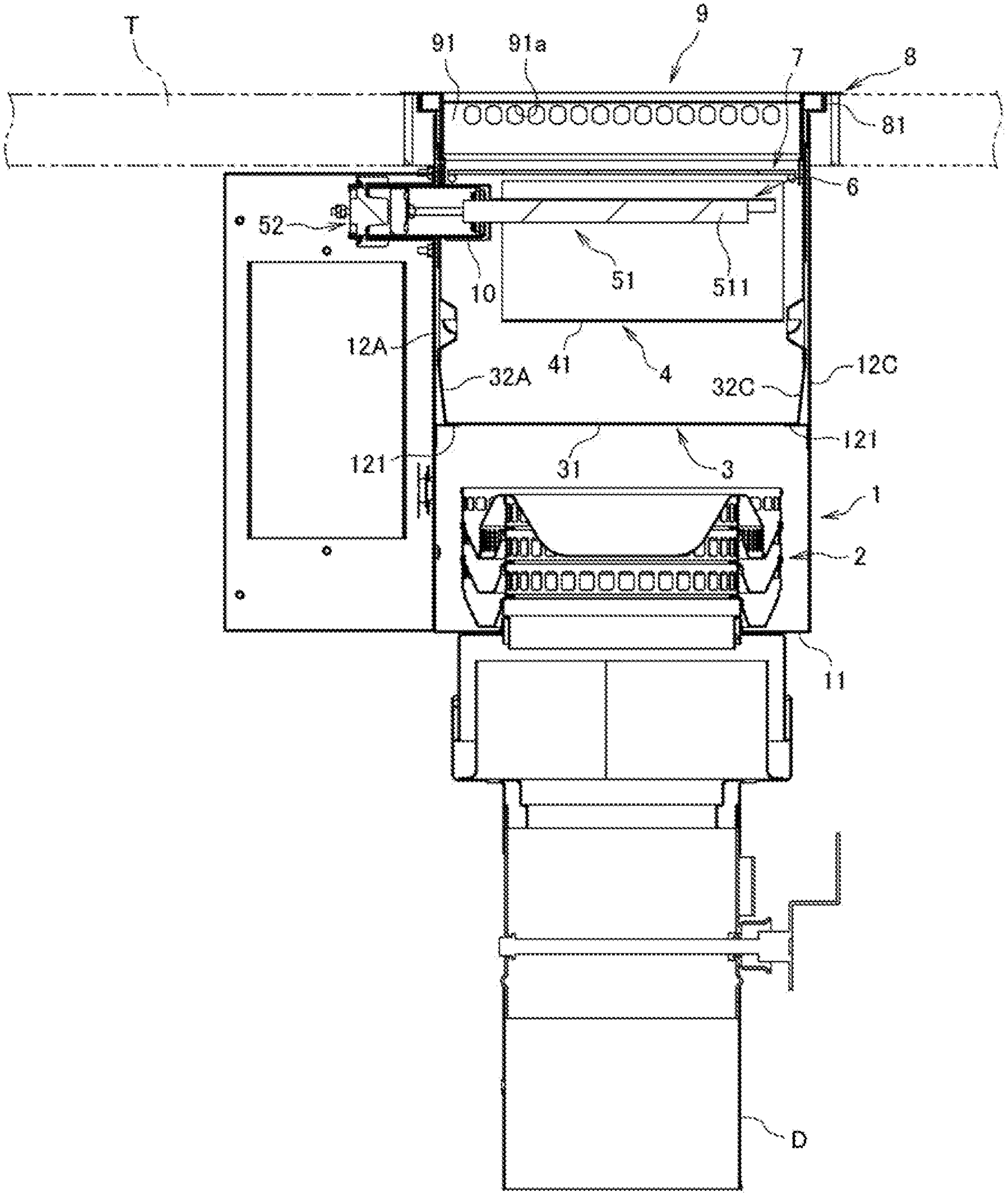

FIG. 1 is a perspective view of a heating cooker 100 installed on a table T. FIG. 2 is an assembly perspective view of the heating cooker 100. FIG. 3 is an exploded perspective view of the heating cooker 100. FIG. 4 is a cross-sectional view taken along line IV-IV of FIG. 2.

As illustrated in FIG. 3, the heating cooker 100 includes an outer casing 1, a filter 2, an inner casing 3, a reflection member 4, a heater structure 5, a heater cover 6, a food material placement member 7, a top cover 8, a top plate 9, and a control unit (not illustrated). The heater structure 5 includes a heater unit 51 and a connector unit 52.

As illustrated in FIG. 1, the outer casing 1 is accommodated in a space in the table T. As illustrated in FIG. 4, the filter 2 and the inner casing 3 are accommodated in the outer casing 1. The reflection member 4, the heater unit 51, the heater cover 6, and the food material placement member 7 are accommodated in the inner casing 3. The top cover 8 and the top plate 9 are disposed on an upper part of the outer casing 1. The connector unit 52 and the control unit are disposed outside the outer casing 1.

The control unit is electrically connected to a power supply. The control unit includes a CPU that performs arithmetic processing, a memory (RAM, ROM) that stores a control program, and the like, and controls the heater structure 5.

As illustrated in FIG. 3, the heater unit 51 includes a resistance heating type heater 511. The connector unit 52 is electrically connected to a power supply by way of the control unit. The heater unit 51 is detachable from the connector unit 52, and when the heater unit 51 is coupled to the connector unit 52, the heater unit 51 and the connector unit 52 are electrically connected. The heater 511 is heating controlled by the control unit.

The food material on the food material placement member 7 is baked by the heat radiated from the heater 511. The heating cooker 100 can be used as, for example, a heating cooker for barbecue or a heating cooker for grilled skewer.

Hereinafter, each component of the heating cooker 100 will be described in detail.

A.1-1 Outer Casing and Filter

Figure 5A:
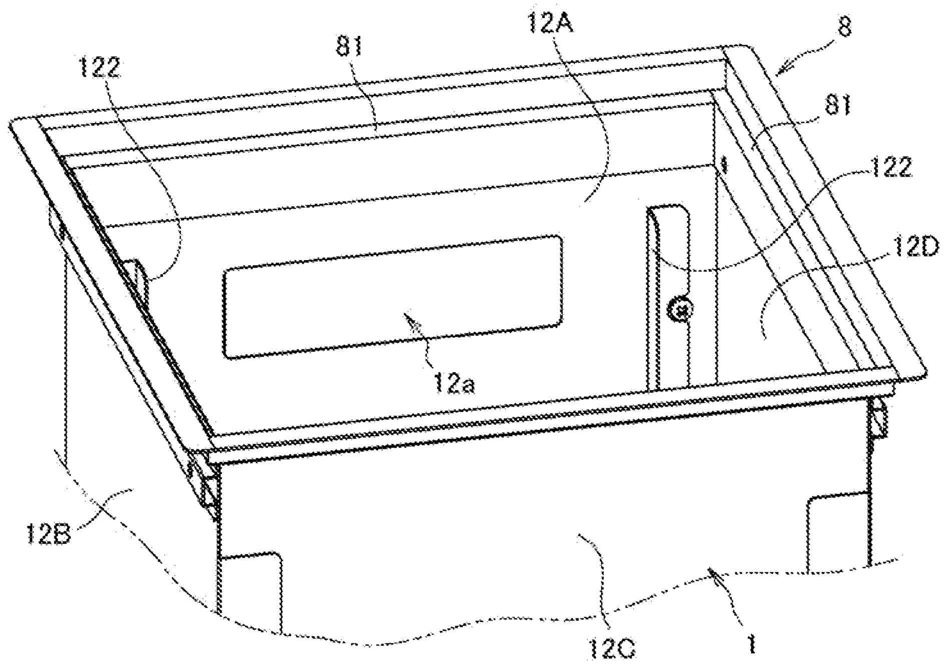
FIG. 5A is a perspective view illustrating the inside of an outer casing before a connector unit is installed in the outer casing.
Figure 5B:
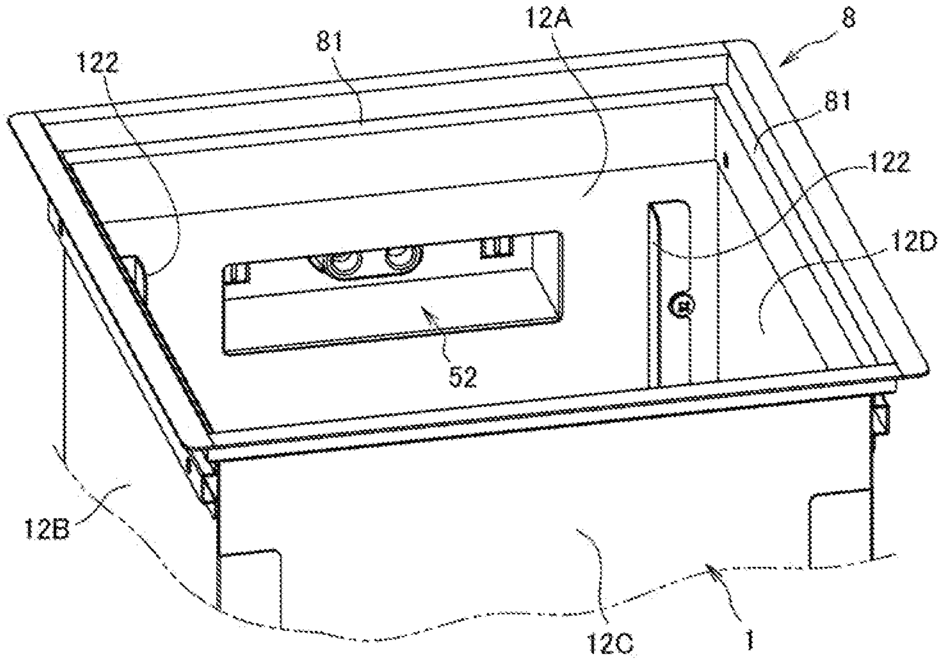
FIG. 5B is a perspective view illustrating the inside of the outer casing after the connector unit is installed in the outer casing.
Figure 6A:
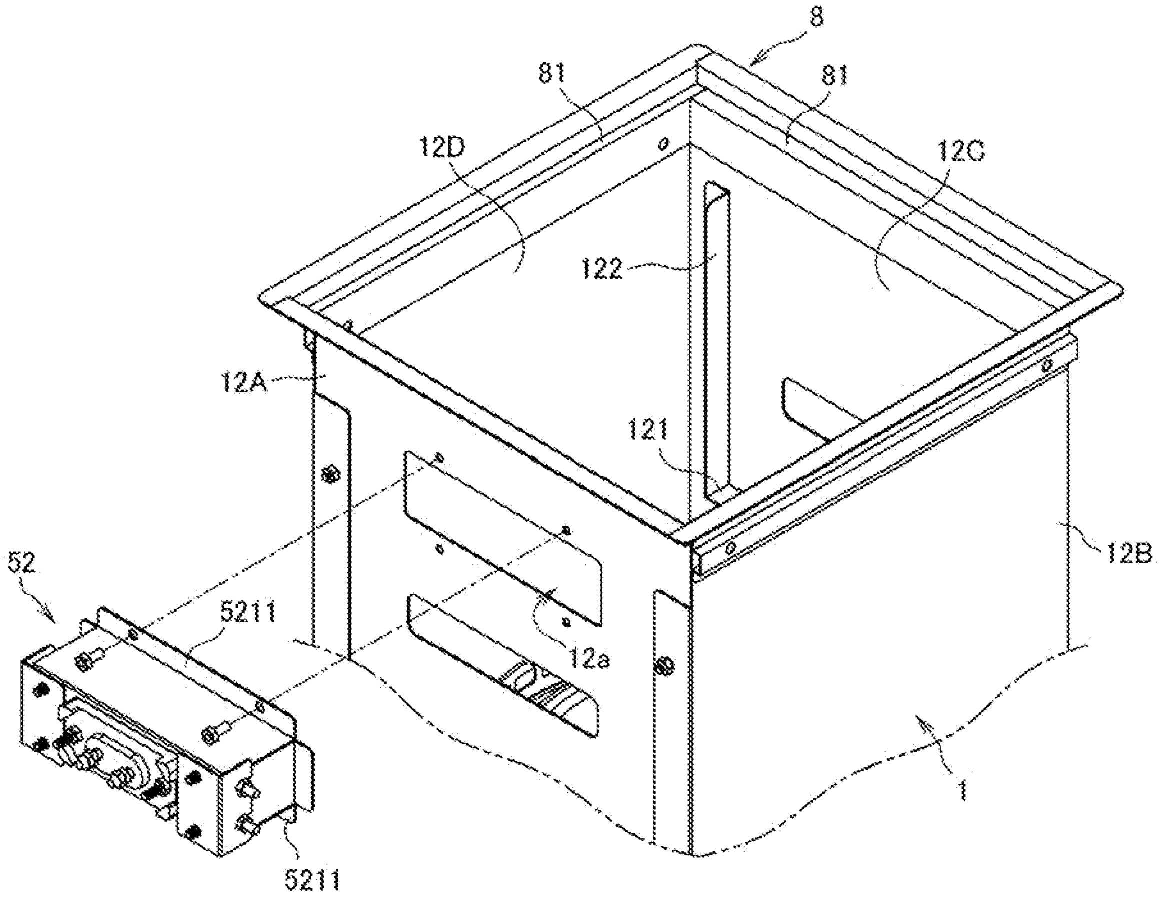
FIG. 6A is a perspective view of the connector unit and the outer casing as viewed from an angle different from that in FIG. 5A, and is a perspective view of the connector unit and the outer casing before the connector unit is installed in the outer casing.
Figure 6B:
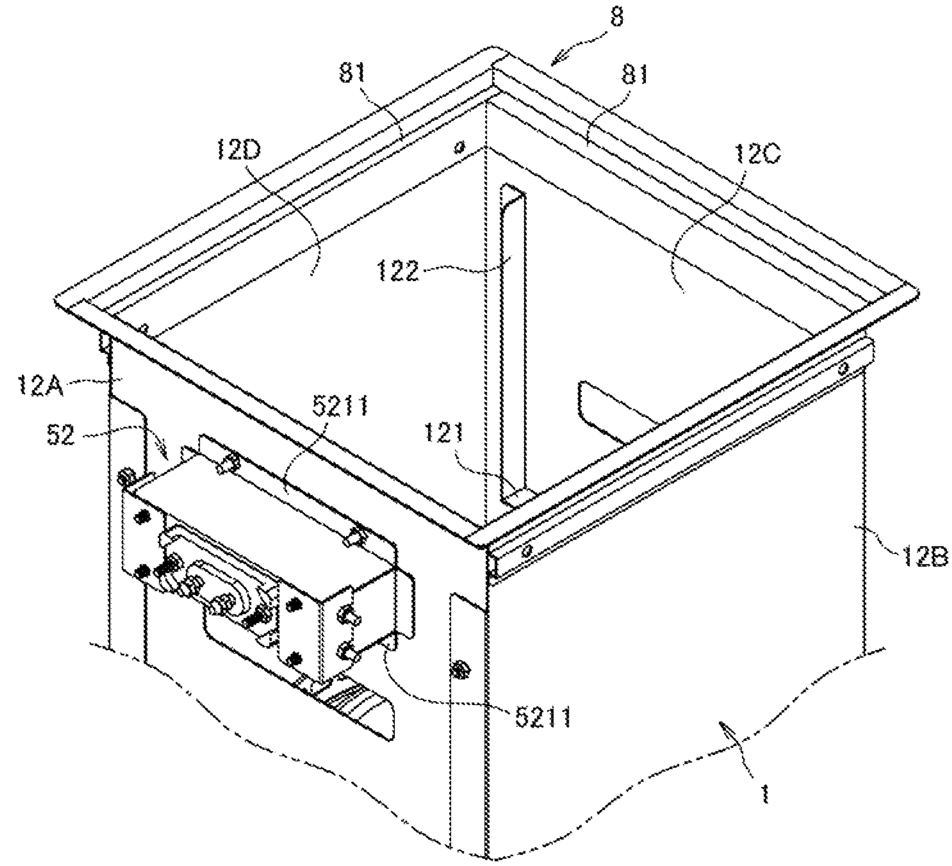
FIG. 6B is a perspective view of the connector unit and the outer casing as viewed from an angle different from that in FIG. 5B, and is a perspective view of the connector unit and the outer casing after the connector unit is installed in the outer casing.

The outer casing 1 and the filter 2 will be described with reference to FIGS. 3 to 6B. FIG. 5A is a perspective view illustrating the inside of the outer casing 1 before the connector unit 52 is installed in the outer casing 1. FIG. 5B is a perspective view illustrating the inside of the outer casing 1 after the connector unit 52 is installed in the outer casing 1. FIGS. 6A and 6B are perspective views as viewed from an angle different from that in FIGS. 5A and 5B. FIG. 6A is a perspective view of the connector unit 52 and the outer casing 1 before the connector unit 52 is installed in the outer casing 1. FIG. 6B is a perspective view of the connector unit 52 and the outer casing 1 after the connector unit 52 is installed in the outer casing 1.

As shown in FIGS. 3 and 4, the outer casing 1 includes a rectangular bottom wall 11 and four side walls 12 (12A to 12D). The outer casing 1 is rectangular in external view. An opening penetrating the bottom wall 11 is provided at the center of the bottom wall 11. The filter 2 is installed in the opening. A duct D is connected to a lower part of the outer casing 1. The duct D communicates with the opening. The duct D is connected to an exhaust device (not illustrated) such as a fan. The smoke generated when the food material is baked is discharged from the duct D through the filter 2 by the exhaust device.

The filter 2 collects oil contained in the smoke generated when the food material is baked. The filter 2 is made of metal such as stainless steel. As illustrated in FIG. 3, in the present embodiment, three ring-shaped filters 2 are vertically stacked. Since the structure of the filter 2 is disclosed in, for example, JP 2011-153722 A, a detailed description related to the structure of the filter 2 will be omitted in the present specification.

As illustrated in FIGS. 3 to 6B, each of the inner surface of the side wall 12A and the inner surface of the side wall 12C facing the side wall 12A includes a support wall 121 and two guide walls 122. The support wall 121 projects out inward from the inner surfaces of the side walls 12A and 12C and extends in the horizontal direction. The bottom wall 31 of the inner casing 3 is placed on the support wall 121. The guide wall 122 projects out inward from the inner surfaces of the side walls 12A and 12C and extends upward from both ends of the support wall 121. The guide wall 122 guides the inner casing 3 when the inner casing 3 is accommodated in the outer casing 1. Furthermore, the guide wall 122 restricts the movement of the inner casing 3 in the horizontal direction, and positions the inner casing 3 in the outer casing 1.

As illustrated in FIGS. 4 to 6B, the top cover 8 is attached to the upper parts of the side walls 12A to 12D.

As illustrated in FIGS. 5A and 6A, the side wall 12 A is provided with an opening 12*a* penetrating through the side wall 12A. The opening 12*a* has a size that allows a heater casing 513 (see FIG. 3) to pass therethrough.

A.1-2 Inner Casing

Figure 7:
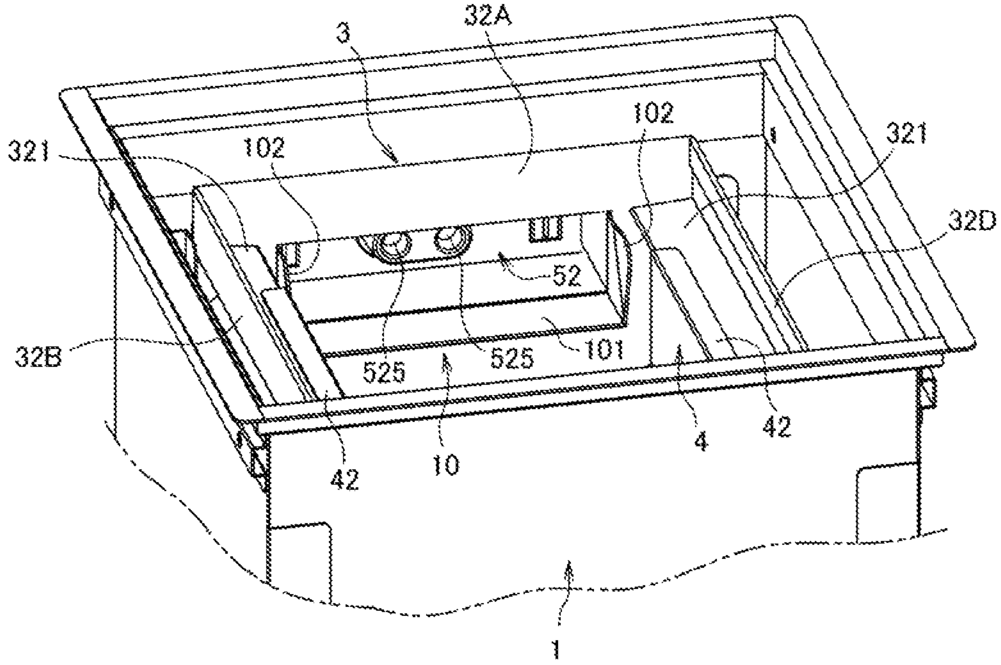
Figure 8:
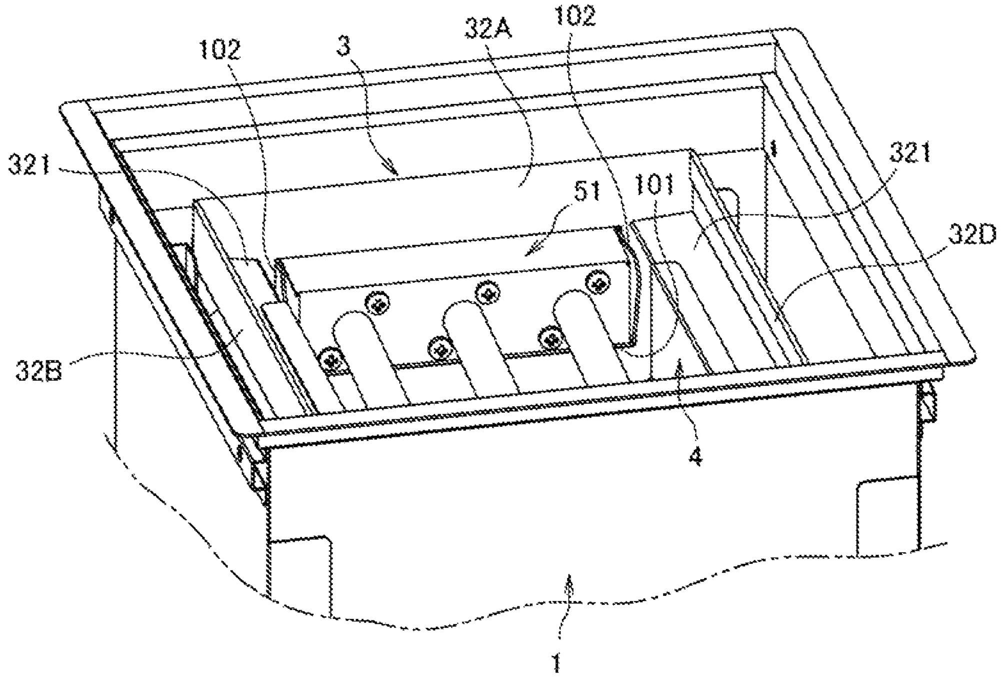

The inner casing 3 will be described with reference to FIGS. 3, 4, 7, and 8. FIG. 7 is a perspective view illustrating the inside of the outer casing 1 after the inner casing 3 is installed in the outer casing 1. FIG. 8 is a perspective view illustrating the inside of the outer casing 1 after the heater unit 51 is installed.

As shown in FIGS. 3 and 4, the inner casing 3 includes a rectangular bottom wall 31 and four side walls 32 (32A to 32D). The inner casing 3 is rectangular in external view. The inner casing 3 is disposed in the outer casing 1 such that a gap exists between the outer surface of the side wall 32 and the inner surface of the side wall 12 of the outer casing 1.

Water is put into the inner casing 3 when the heating cooker 100 is used. Thus, overheating of the inner casing 3 can be prevented. Furthermore, since oil or the like of the food material falls into the water in the inner casing 3, dirt such as oil can be prevented from directly adhering to the bottom wall 31 and the side wall 32 of the inner casing 3.

As illustrated in FIG. 3, an opening 32*a* is formed in the side wall 32A of the inner casing 3 facing the side wall 12A of the outer casing 1. The opening 32*a* faces the opening 12*a* of the outer casing 1. When the inner casing 3 is accommodated in the outer casing 1, the opening 32*a* communicates with the opening 12*a*. The opening 32*a* has a size that allows a heater casing 513 (see FIG. 3), to be described later, to pass therethrough.

As illustrated in FIGS. 4 and 7, a heater bracket 10 for supporting the heater unit 51 is attached to the inner surface of the side wall 32A. The heater bracket 10 includes a bottom wall 101 and two side walls 102. The bottom wall 101 is substantially flush with the bottom edge of the opening 32*a*. The bottom wall 101 extends horizontally and has a distal end inclined upward (see FIGS. 13A and 13B). As illustrated in FIG. 8, the heater unit 51 is placed on the bottom wall 101. The side wall 102 extends upward from both ends of the bottom wall 101 and is substantially flush with the side edge of the opening 32*a*. The side wall 102 restricts horizontal movement of the heater unit 51.

As illustrated in FIGS. 3, 7, and 8, a stepped portion 321 is provided on each of the inner surface of the side wall 32B and the inner surface of the side wall 32D facing the side wall 32B. The reflection member 4 is placed on the stepped portion 321.

A.1-3 Reflection Member

The reflection member 4 will be described with reference to FIGS. 3, 4, and 7. The reflection member 4 reflects heat radiated from the heater 511. The reflection member 4 is made of a material that reflects heat, and for example, is made of metal such as stainless steel. The reflection member 4 is manufactured by, for example, press working a single metal plate.

As illustrated in FIGS. 3 and 4, the reflection member 4 includes a main body portion 41 and two attachment portions 42. The main body portion 41 covers the side surface and the lower surface of the heater 511. One part of the main body portion 41 is disposed on the side of the heater 511, and reflects the heat radiated from the heater 511 to the side toward the food material placement member 7. One part of the main body portion 41 is disposed below the heater 511, and reflects the heat radiated downward from the heater 511 toward the food material placement member 7. An opening 41*a* is provided at the bottom of the main body portion 41. Oil and the like of the food material fall into the water in the inner casing through the opening 41*a*. The two attachment portions 42 are provided at both ends of the main body portion 41, respectively. Each of the attachment portions 42 is substantially perpendicular to the main body portion 41. As illustrated in FIG. 7, each of the attachment portions 42 is placed on the stepped portion 321 of the inner casing 3.

A.1-4 Food Material Placement Member

With reference to FIG. 3, the food material placement member 7 will be described. As illustrated in FIG. 3, the food material placement member 7 is a square type. The food material placement member 7 is, for example, a net. The food material placement member 7 is placed on the stepped portion 321 of the inner casing 3. More specifically, after the reflection member 4 is placed on the stepped portion 321, the food material placement member 7 is placed on the reflection member 4.

A.1-5 Top Cover and Top Plate

The top cover 8 and the top plate 9 will be described with reference to FIGS. 2 to 4. The top cover 8 is fixed to the upper end of the outer casing 1. The top cover 8 has a stepped portion 81. The top plate 9 is placed on the stepped portion 81.

The top plate 9 includes a side wall 91 and an upper wall 92.

A plurality of through holes 91*a* are formed in the side wall 91. The through hole 91*a* communicates with a gap between the side wall 12 of the outer casing 1 and the side wall 32 of the inner casing 3. When the exhaust device is operated, smoke generated from the food material being heating cooked is sucked into the through hole 91*a*. The smoke then flows downward through the gap between the side wall 12 and the side wall 32. Accordingly, smoke can be prevented from rising from the food material placement member 7.

A plurality of through holes 92*a* are formed in the upper wall 92. The through hole 92*a* is provided proximate to the side wall 12 of the outer casing 1 than the through hole 91*a*. The through hole 92*a* communicates with a gap between the side wall 12 of the outer casing 1 and the side wall 32 of the inner casing 3. When the exhaust device is operated, the outside air is sucked from the through hole 92*a*. Then, the outside air flows downward through the gap between the side wall 12 and the side wall 32.

When the outside air is sucked from the through hole 92*a*, the upper wall 92 is cooled by the outside air, and overheating of the upper wall 92 can be suppressed. As a result, burns of the eater can be prevented. In addition, since the through hole 92*a* is provided proximate to the side wall 12 than the through hole 91*a*, the outside air sucked through the through hole 92*a* flows near the inner surface of the side wall 12 than the smoke sucked through the through hole 91*a*. Therefore, smoke containing oil can be prevented from coming into direct contact with the inner surface of the side wall 12 due to the outside air sucked from the through hole 92*a*, and hence adhesion of dirt to the inner surface of the side wall 12 can be reduced.

A.1-6 Heater Structure

Next, the heater structure 5 will be described. As described above, the heater structure 5 includes the heater unit 51 and the connector unit 52.

A.1-6-1 Heater Unit

Figure 9A:
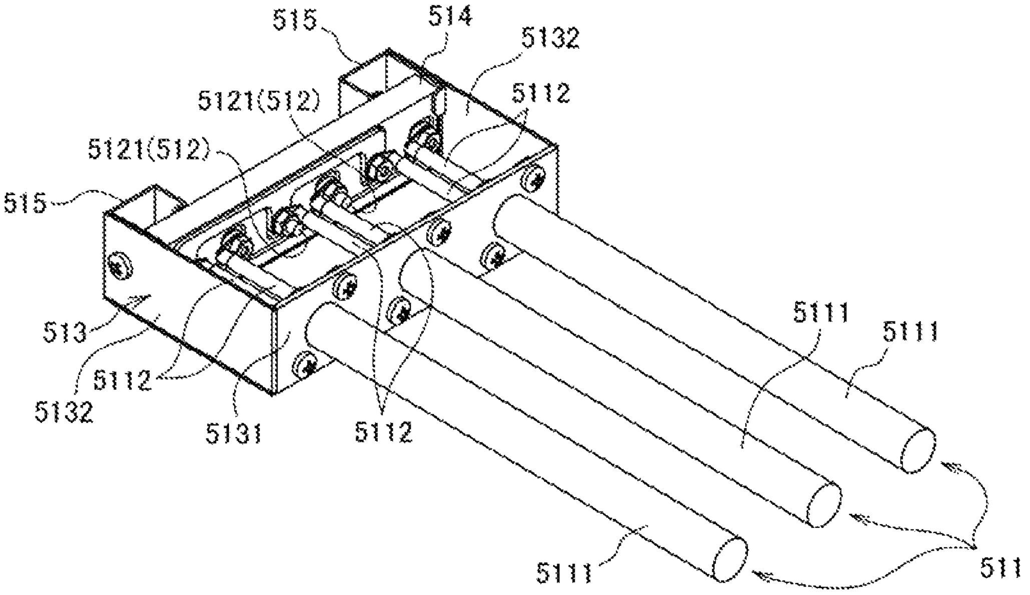
FIG. 9A is a perspective view of the heater unit.
Figure 9B:
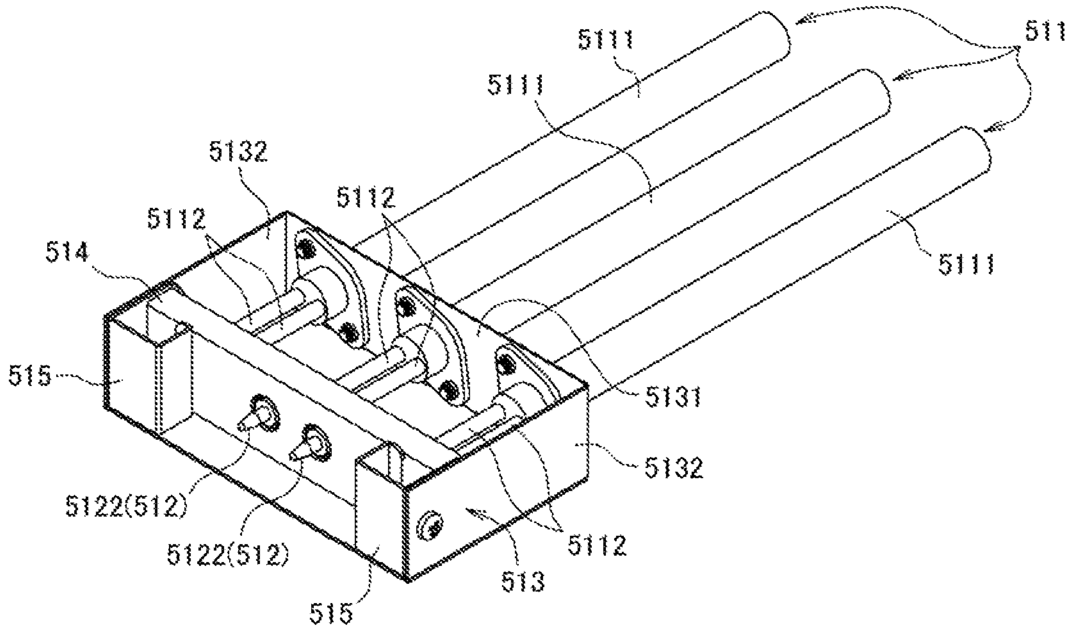
FIG. 9B is a perspective view of the heater unit as viewed from an angle different from that in FIG. 9A.

First, the heater unit 51 will be described with reference to FIGS. 9A and 9B. FIG. 9A is a perspective view of the heater unit 51. FIG. 9B is a perspective view of the heater unit 51 as viewed from an angle different from that in FIG. 9A. In FIGS. 9A and 9B, the upper surface of the heater casing 513 is omitted to clearly show the inside of the heater casing 513.

As illustrated in FIGS. 9A and 9B, the heater unit 51 includes a plurality of heaters 511 (three heaters in the present embodiment), a pair of first terminals 512, a heater casing 513, a first insulator 514, and a pressing member 515.

The heater 511 is a resistance heating type heater that generates heat by flowing current through a resistor. The heater 511 includes a heat generating portion 5111 and a lead wire 5112. The heat generating portion 5111 is electrically connected to the lead wire 5112. The heat generating portion 5111 interiorly includes a nichrome wire, and generates heat by the current sent from the lead wire 5112. The magnitude of the current flowing through the heat generating portion 5111 can be adjusted by the control unit.

As the heater 511, for example, a cartridge heater or a sheathed heater can be used. In the present specification, the cartridge heater means a heater in which the heat generating portion is covered with a sheath, and two lead wires extend only from one end portion of the heat generating portion. Furthermore, in the present specification, the cartridge heater means a heater in which the heat generating portion is covered with a sheath, and one lead wire extends from one end portion of the heat generating portion and the other lead wire extends from the other end portion of the heat generating portion. In the present embodiment, three cartridge-type heaters 511 are arranged in parallel.

The heater casing 513 is made of a magnetic material such as ferritic or martensitic stainless steel, and has a rectangular parallelepiped shape. Three through holes through which the three heat generating portions 5111 can pass are formed substantially at the center in the vertical direction of the front wall 5131 of the heater casing 513. The heater casing 513 does not have a rear wall, and the rear side of the heater casing 513 is opened.

The heater 511, the first terminal 512, and the first insulator 514 are assembled, and the assembled assembly is placed in the heater casing 513 from the rear side of the heater casing 513. The heat generating portion 5111 extends out of the heater casing 513 through a through hole provided in the front wall 5131. The lead wire 5112, the first terminal 512, and the first insulator 514 are disposed in the heater casing 513. The heater 511 is fixed to the front wall 5131. The pressing member 515 is disposed in contact with the rear surface of the first insulator 514 and is fixed to the side wall 5132. The first insulator 514 is fixed to the heater casing 513 by the pressing member 515. The heater unit 51 is completed in such a manner. The heater unit 51 is vertically symmetric, that is, the shape in top view and the shape in bottom view of the heater unit 51 are the same. As a result, the heater unit 51 can be inverted upside down and used.

Two through holes are formed in the first insulator 514. The pair of first terminals 512 is inserted into the two through holes of the first insulator 514, respectively, and is fixed so as to be immovable with respect to the first insulator 514. Each of the first terminals 512 is made of a conductive material such as metal. The first terminal 512 is electrically insulated from the heater casing 513 by the first insulator 514. The length of each first terminal 512 is larger than the thickness of the first insulator 514. Therefore, both ends of each first terminal 512 extend from the first insulator 514. Each of the first terminals 512 has a first portion 5121 extending from the first insulator 514 to the heater 511 side (i.e., the front side) and a second portion 5122 extending from the first insulator 514 to the side opposite to the first portion 5121 (i.e., the rear side).

The lead wires 5112 of the three heaters 511 are electrically connected to the first portion 5121 of the first terminal 512. In the present embodiment, each lead wire 5112 of the three heaters 511 is connected to the first terminal 512 such that the three heaters 511 are connected in parallel.

The second portion 5122 of the first terminal 512 is brought into contact with a first surface 5251*a* (see FIG. 12C) of the second terminal 525 to be described later. The distal end of the second portion 5122 is tapered. The diameter of the distal end of the second portion 5122 is smaller than the diameter of the first surface 5251*a*.

Figure 10:
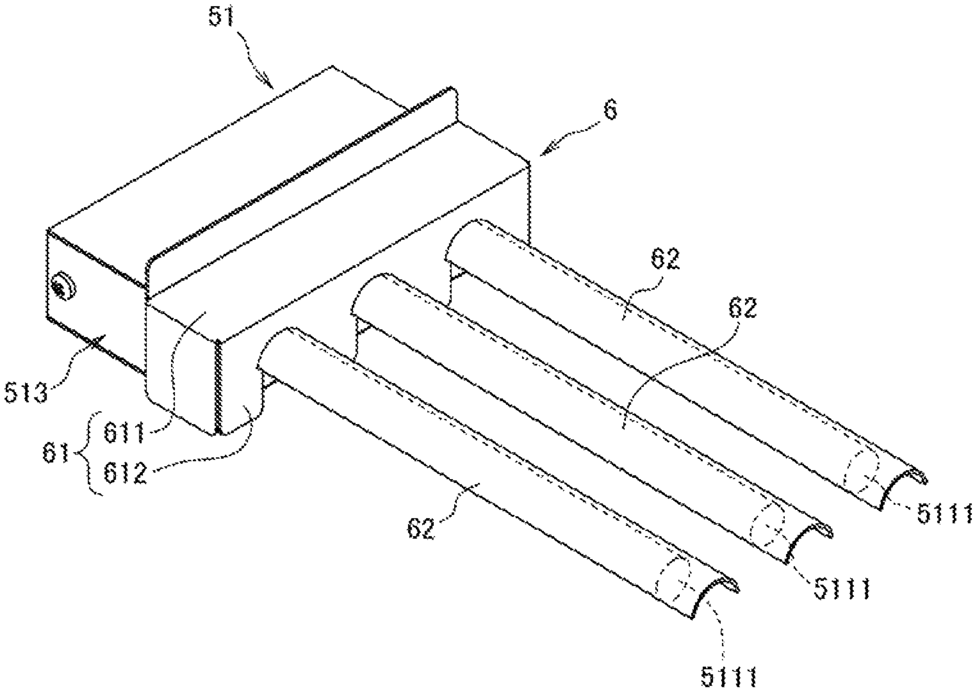

FIG. 10 is a perspective view of the heater unit 51 to which the heater cover 6 is attached. As illustrated in FIG. 10, the heater cover 6 covers the heater unit 51 and protects the heater unit 51. The heater cover 6 is preferably detachably attached to the heater unit 51. The heater cover 6 includes a casing cover 61 and a plurality of heat generating portion covers 62. The heater cover 6 is preferably made of a material having high thermal conductivity, and for example, is made of metal such as stainless steel.

The casing cover 61 covers the heater casing 513. The casing cover 61 includes a first portion 611 and a second portion 612. The first portion 611 is disposed on the heater casing 513 and covers a portion of the upper surface of the heater casing 513 exposed to the inside of the inner casing 3 when the heater unit 51 is coupled to the connector unit 52. The second portion 612 covers the front wall 5131 of the heater casing 513.

The plurality of heat generating portion covers 62 are provided by the same number as the heat generating portion 5111. The plurality of heat generating portion covers 62 extend from the casing cover 61, are disposed above each of the heat generating portions 5111, and cover the upper surfaces of each of the heat generating portions 5111.

A.1-6-2 Connector Unit

Figure 11:
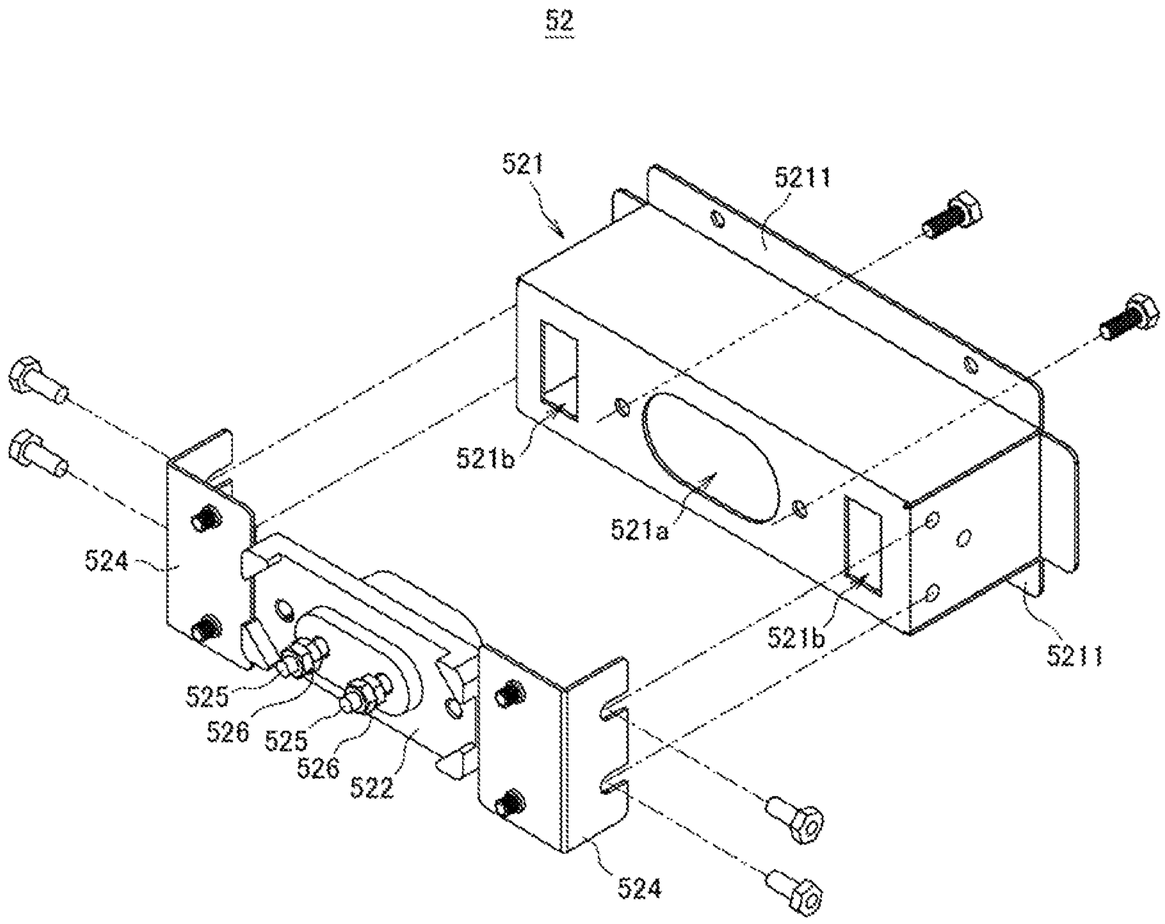
Figure 12A:
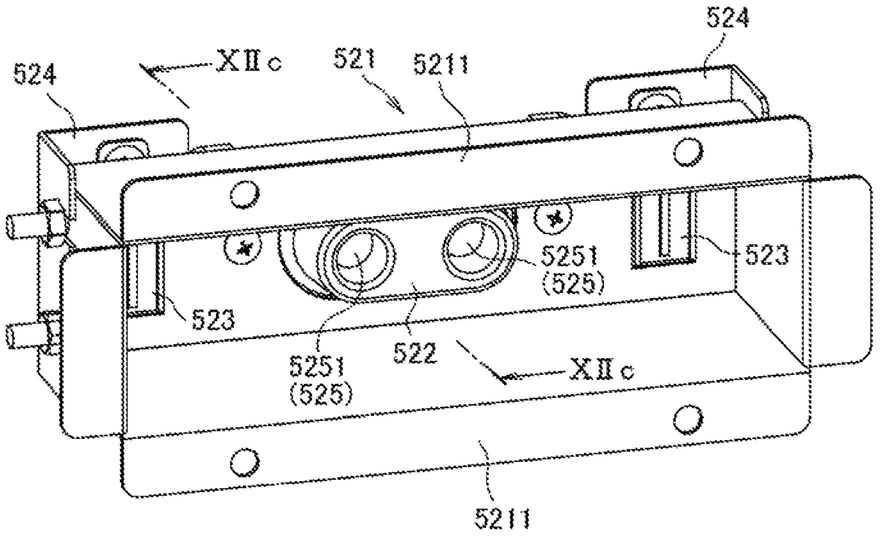
FIG. 12A is an assembly perspective view of the connector unit.
Figure 12B:
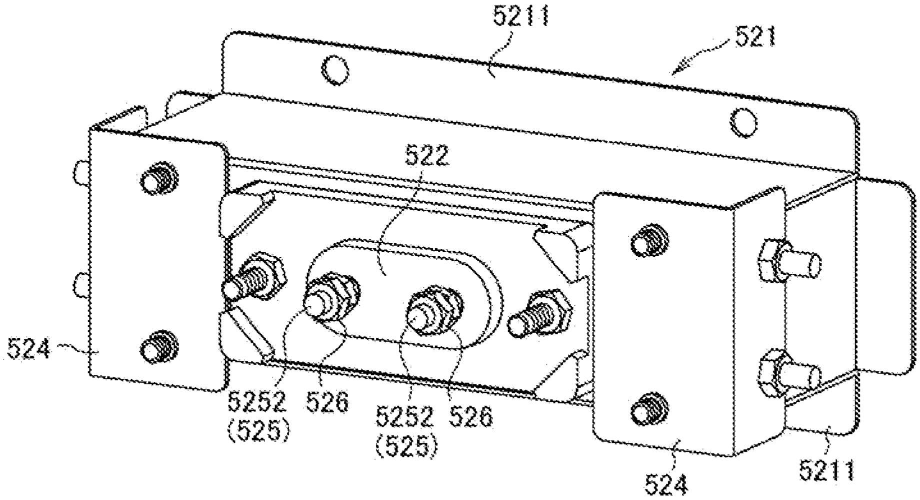
FIG. 12B is an assembly perspective view of the connector unit as viewed from an angle different from that in FIG. 12A.
Figure 12C:
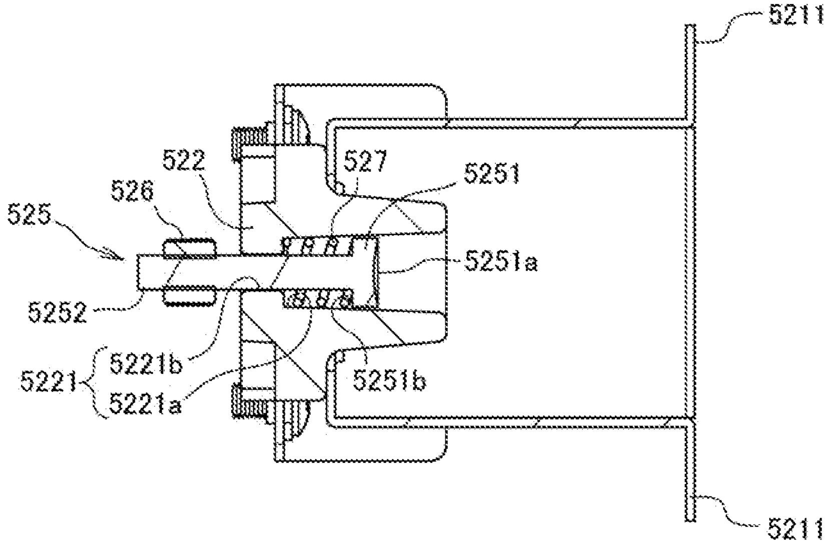
FIG. 12C is a cross-sectional view taken along line XIIc-XIIc in FIG. 12A.

Next, the connector unit 52 will be described with reference to FIGS. 6A, 6B, 7, 11, and 12A to 12C. FIG. 11 is an exploded perspective view of the connector unit 52. FIG. 12A is an assembly perspective view of the connector unit 52. FIG. 12B is an assembly perspective view of the connector unit 52 as viewed from an angle different from that in FIG. 12A. FIG. 12C is a cross-sectional view taken along line XIIc-XIIc in FIG. 12A.

As illustrated in FIGS. 11 and 12A to 12C, the connector unit 52 includes a connector casing 521, a second insulator 522, a plurality of permanent magnets 523 (two in the present embodiment), a plurality of holding members 524 (two in the present embodiment), a pair of second terminals 525, a fixing member 526, and a first elastic member 527.

The connector casing 521 has a central opening 521*a* provided at the center and side openings 521*b* provided one on both sides of the central opening 521*a*. The second insulator 522 is fitted into the central opening 521*a* and fixed to the connector casing 521. The permanent magnets 523 are attached to the holding member 524 one by one. The holding member 524 is fixed to the connector casing 521 in a state where the permanent magnet 523 is fitted into the side opening 521*b*. In this way, the two permanent magnets 523 are arranged one on both sides of the second insulator 522.

The connector casing 521 includes a flange 5211 at an upper part and a lower part thereof. As shown in FIGS. 6A and 6B, the connector casing 521 (i.e., the connector unit 52) is fixed so as not to move with respect to the outer casing 1 by fixing the flange 5211 to the outer casing 1.

As illustrated in FIG. 7, when the connector unit 52 is attached to the outer casing 1, the pair of second terminals 525 is exposed to the inside of the outer casing 1 and the inside of the inner casing 3 through the opening 12*a* and the opening 32*a*.

The second terminal 525 is made of a conductive material such as metal. As shown in FIG. 12C, the second terminal 525 includes a first portion 5251 and a second portion 5252. The first portion 5251 and the second portion 5252 have, for example, a circular column shape. The first portion 5251 includes a first surface 5251*a* that comes into contact with the first terminal 512 and a second surface 5251*b* on a side opposite to the first surface 5251*a*. The first surface 5251*a* is a concave curved surface. The second portion 5252 is integrally formed with the first portion 5251. The second portion 5252 extends from the second surface 5251*b* of the first portion 5251. The diameter of the second portion 5252 is smaller than the diameter of the first portion 5251.

Two through holes 5221 penetrating through the second insulator 522 are formed in the second insulator 522. The pair of second terminals 525 are respectively inserted into the two through holes 5221. Each of the second terminals 525 is axially slidable in the through hole 5221. The second terminal 525 is electrically insulated from the connector casing 521 by the second insulator 522.

Each through hole 5221 includes a first through hole 5221*a* and a second through hole 5221*b* communicating with the first through hole 5221*a*. The diameter of the first through hole 5221*a* is slightly larger than the diameter of the first portion 5251 of the second terminal 525. The diameter of the second through hole 5221*b* is smaller than the diameter of the first portion 5251 of the second terminal 525 and slightly larger than the diameter of the second portion 5252 of the second terminal 525.

The first portion 5251 of the second terminal 525 is disposed in the first through hole 5221*a*. The second portion 5252 of the second terminal 525 extends through the first through hole 5221*a* and the second through hole 5221*b*.

The total length of the second terminal 525 is longer than the total length of the through hole 5221. Therefore, the second portion 5252 extends from the second through hole 5221*b* to the outside of the second insulator 522. The fixing member 526 for fixing the lead wire is attached to the second portion 5252 extending from the second through hole 5221*b*. The fixing member 526 is, for example, a nut screwed to the second portion 5252. The lead wire connected to the second portion 5252 is connected to the control unit, so that the second terminal 525 is electrically connected to the power supply through the control unit.

In the present embodiment, the outer diameter of the fixing member 526 is larger than the diameter of the second through hole 5221*b*. Accordingly, the fixing member 526 also functions as a stopper for preventing the second portion 5252 extending from the second through hole 5221*b* from being completely drawn into the second insulator 522. That is, when the second terminal 525 is moved in the right direction in FIG. 12C, the fixing member 526 comes into contact with the second insulator 522, so that the second terminal 525 cannot move in the right direction any further. As a result, a state in which a part of the second portion 5252 extends from the second insulator 522 can be maintained.

As shown in FIG. 12C, a gap exists between the second portion 5252 present in the first through hole 5221*a* and the inner surface of the first through hole 5221*a*. The first elastic member 527 is disposed in this gap. In the present embodiment, the first elastic member 527 is a coil spring. The second portion 5252 of the second terminal 525 is inserted into the first elastic member 527. The inner diameter of the first elastic member 527 is larger than the diameter of the second through hole 5221*b* and is smaller than or equal to the diameter of the first portion 5251 of the second terminal 525. Therefore, the first elastic member 527 is sandwiched between the first portion 5251 and the wall portion of the second insulator 522. That is, one end portion of the first elastic member 527 is brought into contact with the second surface 5251*b* of the first portion 5251, and the other end portion of the first elastic member 527 is brought into contact with the wall portion of the second insulator 522.

A.2 Method of Attaching and Detaching Heater Unit and Connector Unit

Figure 13A:
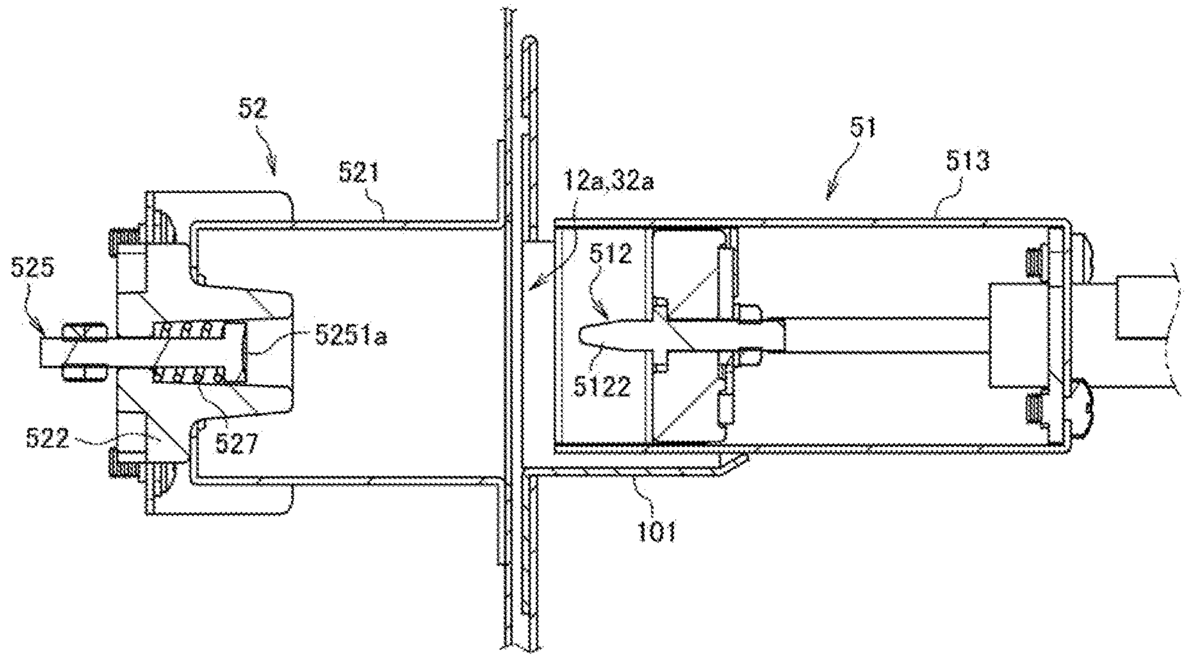
FIG. 13A is a cross-sectional view before the heater unit and the connector unit are coupled.
Figure 13B:
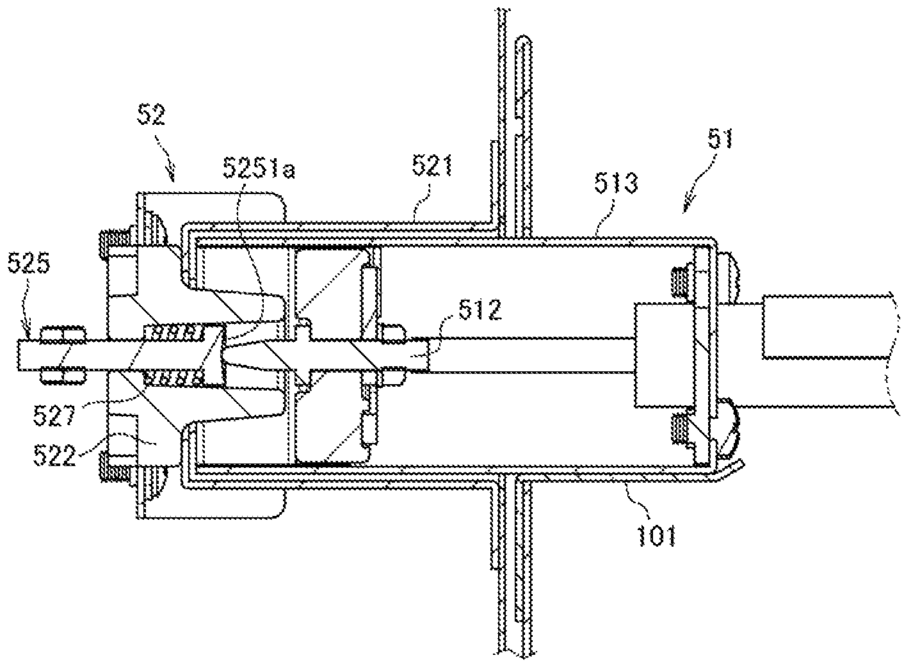

A method for attaching and detaching the heater unit 51 and the connector unit 52 will be described with reference to FIGS. 13A and 13B. FIG. 13A is a cross-sectional view before the heater unit 51 and the connector unit 52 are coupled. FIG. 13B is a cross-sectional view after the heater unit 51 and the connector unit 52 are coupled.

First, a case where the heater unit 51 is coupled to the connector unit 52 will be described. After the food material placement member 7 and the heater cover 6 are detached, as illustrated in FIG. 13A, the heater casing 513 of the heater unit 51 is inserted into the opening 32*a* of the inner casing 3 and the opening 12*a* of the outer casing 1 from the inside of the inner casing 3. As illustrated in FIG. 13B, each first terminal 512 is brought into contact with the first surface 5251*a* of each second terminal 525, and the heater unit 51 is pushed toward the connector unit 52. As a result, the second terminal 525 is pushed by the first terminal 512. When the second terminal 525 is pushed in, the first elastic member 527 is compressed between the first portion 5251 of the second terminal 525 and the wall portion of the second insulator 522.

The heater unit 51 is coupled to the connector unit 52 by the heater casing 513 adhering to the permanent magnet 523 of the connector unit 52. The heater casing 513 is placed on the bottom wall 101 of the heater bracket 10, and the heater 511 is in a horizontal posture.

When the heater unit 51 and the connector unit 52 are coupled, the second terminal 525 is constantly pressed toward the first terminal 512 by the restoring force of the compressed first elastic member 527. As a result, electrical contact between the first terminal 512 and the second terminal 525 is maintained. Current flows through the heater 511, and the heat generating portion 5111 is heated by turning on the switch of the control unit.

Next, a case where the heater unit 51 is detached from the connector unit 52 will be described. When the heater unit 51 is slightly inclined upward with respect to the connector unit 52 after the food material placement member 7 and the heater cover 6 are detached, the heater unit 51 is detached from the connector unit 52. The heater unit 51 can be detached from the connector unit 52 in such a manner.

A.3 Features

In the case of an electric heater in which a plurality of components are not unitized, each component needs to be cleaned, which takes time and effort. On the other hand, since the heater unit 51 of the present invention is unitized, the heater unit 51 itself merely needs to be cleaned, and labor required for cleaning the heater unit 51 can be reduced. Furthermore, since the heater unit 51 is detachable, the heater unit 51 can be detached from the heating cooker 100 to clean the heater unit 51 alone, whereby cleaning of the heater unit 51 is simplified.

The rod shape of the heater 511 increases the strength of the heater 511. As a result, even if the user accidentally hits the heater 511 or drops heater unit 51 on the floor, the heater 511 is less likely to break. Further, since the heater 511 has a circular column shape, even if dirt such as meat juice falls on the surface of the heater 511, the dirt does not stay on the surface of the heater 511 and falls while sliding on the surface of the heater 511. As a result, the heater 511 is less likely to get dirty.

In the heater structure 5 of the present invention, when the heater unit 51 and the connector unit 52 are coupled, the second terminal 525 is constantly pressed toward the first terminal 512 by the restoring force of the compressed first elastic member 527. Thus, electrical contact between first terminal 512 and second terminal 525 can be reliably maintained during use of the heating cooker 100. That is, electric connection between heater 511 and the power supply can be reliably ensured during use of the heating cooker 100.

Since the heater unit 51 and the connector unit 52 are detachably coupled, the heater unit 51 can be detached from the connector unit 52 (i.e., heating cooker 100). Accordingly, disassembly and cleaning of the heating cooker 100 and repair and replacement of the heater unit 51 can be easily performed. In particular, since the heater casing 513 and the connector casing 521 are detachably coupled by the magnetic force of the permanent magnet 523, the heater casing 513 and the connector casing 521 can be easily coupled and uncoupled by one-touch operation.

As shown in FIG. 13A, since the diameter of the second portion 5122 of the first terminal 512 is smaller than the diameter of the first surface 5251*a* of the second terminal 525 and the first surface 5251*a* is a concave curved surface, a state in which the first terminal 512 is brought into contact with the center of the first surface 5251*a* can be maintained. More specifically, even if the first terminal 512 first comes into contact with a position deviated from the center of the first surface 5251*a*, the first terminal 512 is guided from the position brought into contact first to the center of the first surface 5251*a* along the concave curved surface of the first surface 5251*a*, and comes into contact with the second terminal 525 at the center of the first surface 5251*a*. As a result, stable contact between the first terminal 512 and the second terminal 525 can be maintained.

Since the heater unit 51 can be inverted upside down and used, the vertical direction when the heater unit 51 is coupled to the connector unit 52 is not limited, and hence the heater unit 51 can be easily coupled to the connector unit 52. In addition, since the heater unit 51 is periodically inverted upside down and used, the degree of dirtiness of the surface of the heat generating portion 5111 can be equalized, and therefore the progress of corrosion of the heat generating portion 5111 caused by salts contained in oil or sauce can be delayed. As a result, the life of the heater unit 51 can be extended.

One part of the reflection member 4 is disposed below the heater 511, and thus can reflect the heat radiated downward from the heater 511 toward the food material placement member 7. Therefore, the food material can be efficiently cooked.

The heater unit 51 can be prevented from getting dirty by providing the heater cover 6. That is, the first portion 611 of the casing cover 61 can prevent dirt from adhering to the upper surface of the heater casing 513. The second portion 612 of the casing cover 61 can prevent dirt from entering inside the heater casing 513 through the gap between the through hole of the front wall 5131 and the heat generating portion 5111. By providing the heat generating portion cover 62, dirt can be prevented from adhering to the heat generating portion 5111, corrosion of the heat generating portion 5111 caused by salts contained in oil or sauce is reduced, and durability of the heat generating portion 5111 can be improved.

B. Second Embodiment

A heating cooker 100 and a heater structure 5 according to a second embodiment will be described. Hereinafter, differences from the first embodiment will be mainly described. Among the components of the second embodiment, the same components as those of the first embodiment are denoted by the same reference numerals, and the description thereof will be omitted.

B.1 Structure of Outer Casing and Connector Unit

Figure 14A:
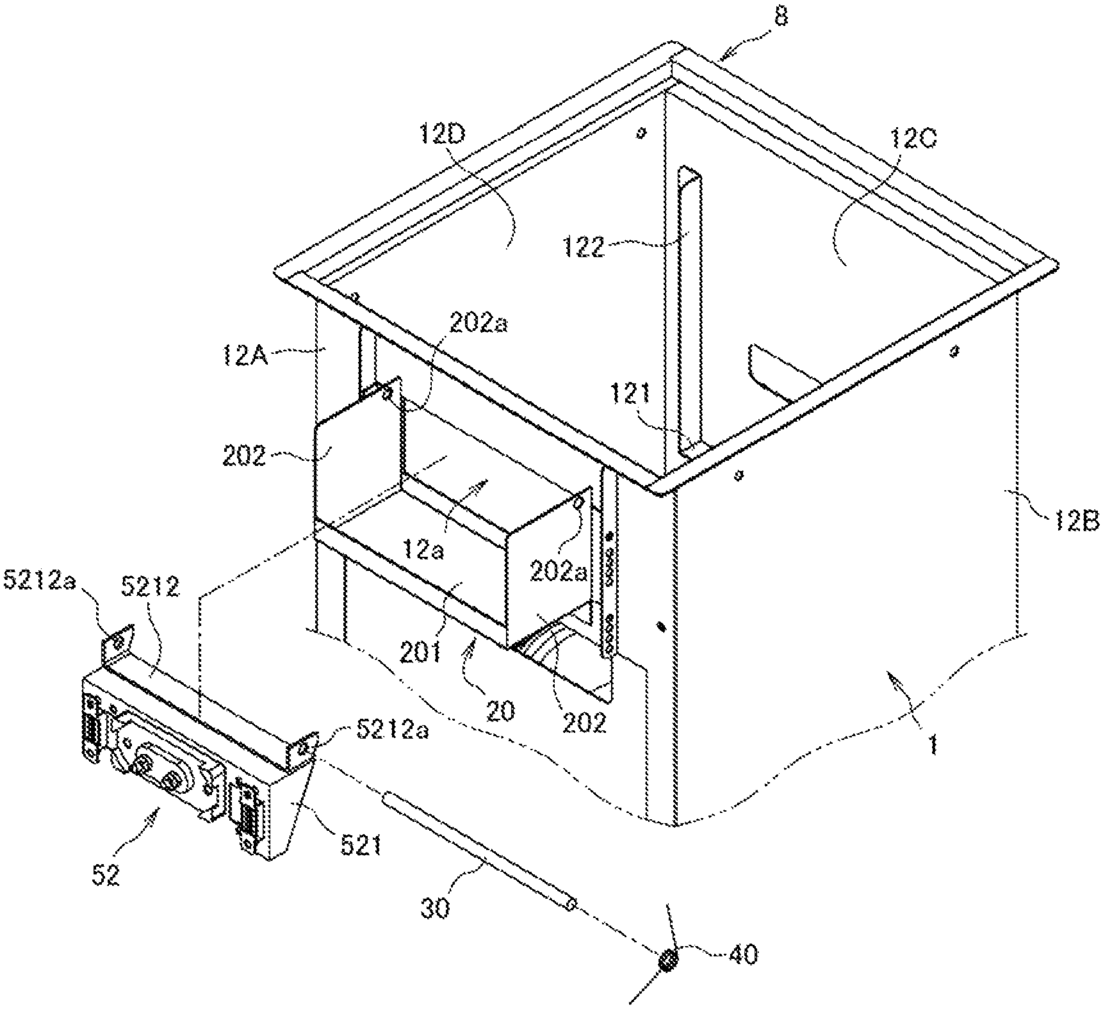
Figure 14B:
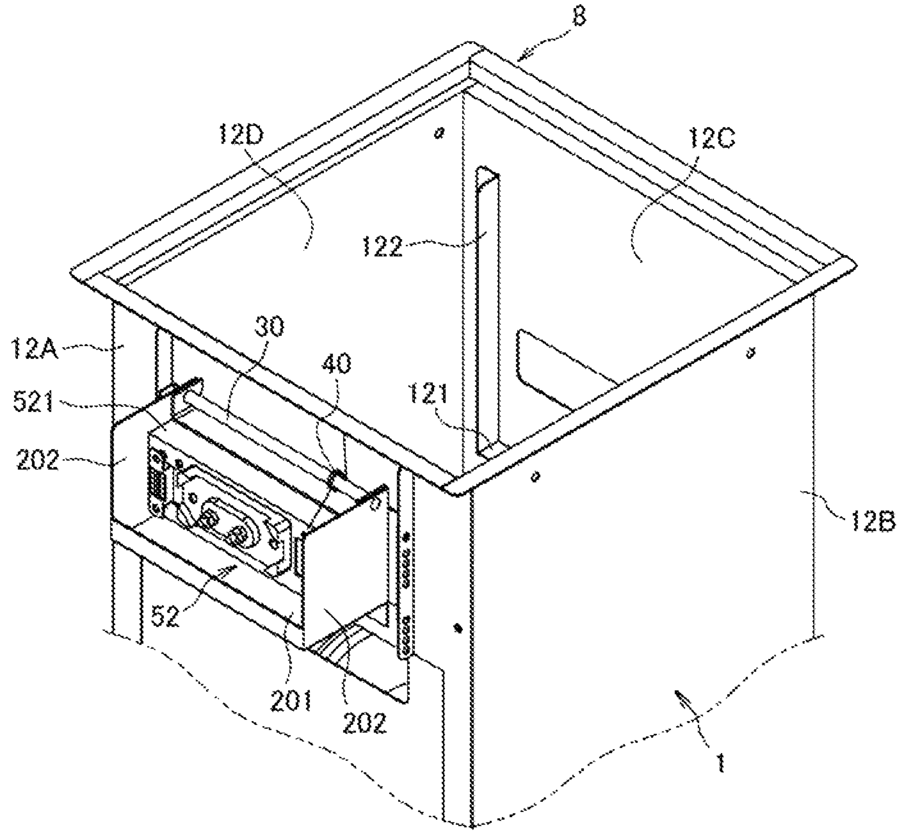
FIG. 14B is a perspective view of the connector unit and the outer casing after the connector unit is installed in the outer casing.
Figure 15A:
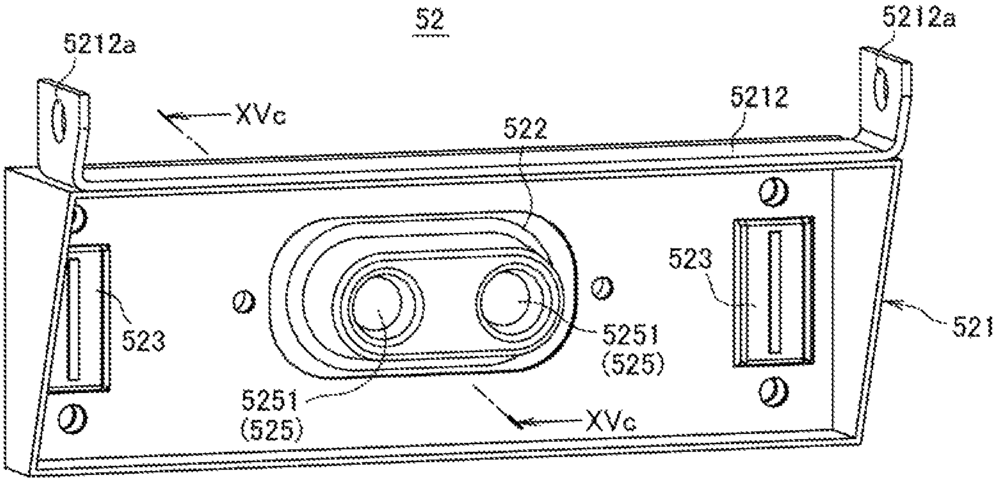
FIG. 15A is an assembly perspective view of the connector unit.
Figure 15B:
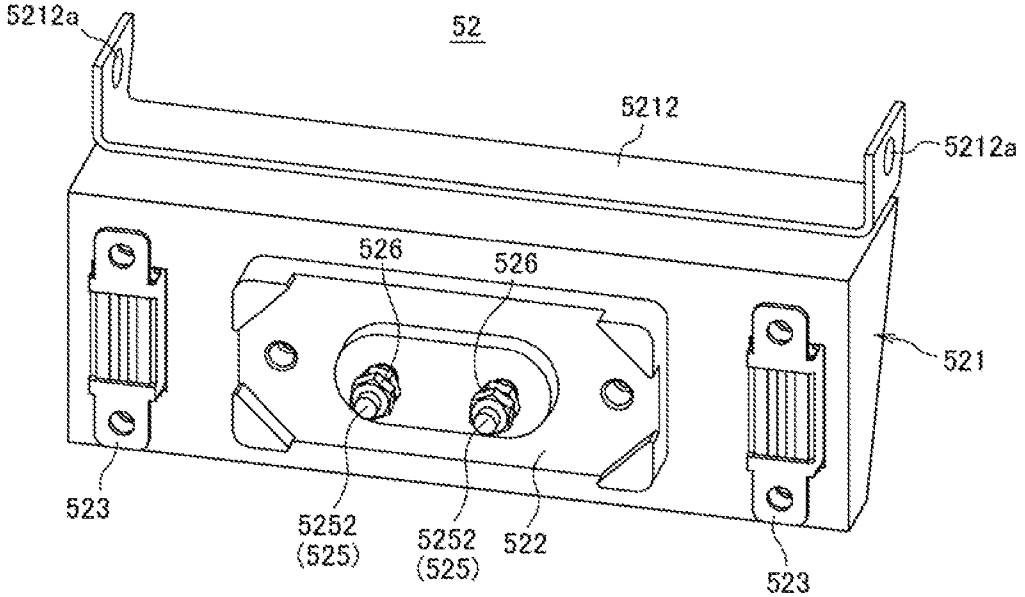
FIG. 15B is an assembly perspective view of the connector unit as viewed from an angle different from that in FIG. 15A.
Figure 15C:
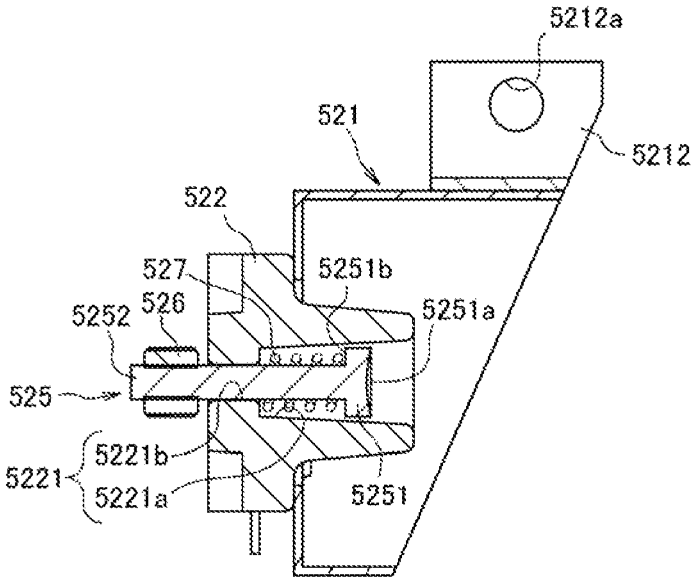
FIG. 15C is a cross-sectional view taken along line XVc-XVc in FIGURE
Figure 16:
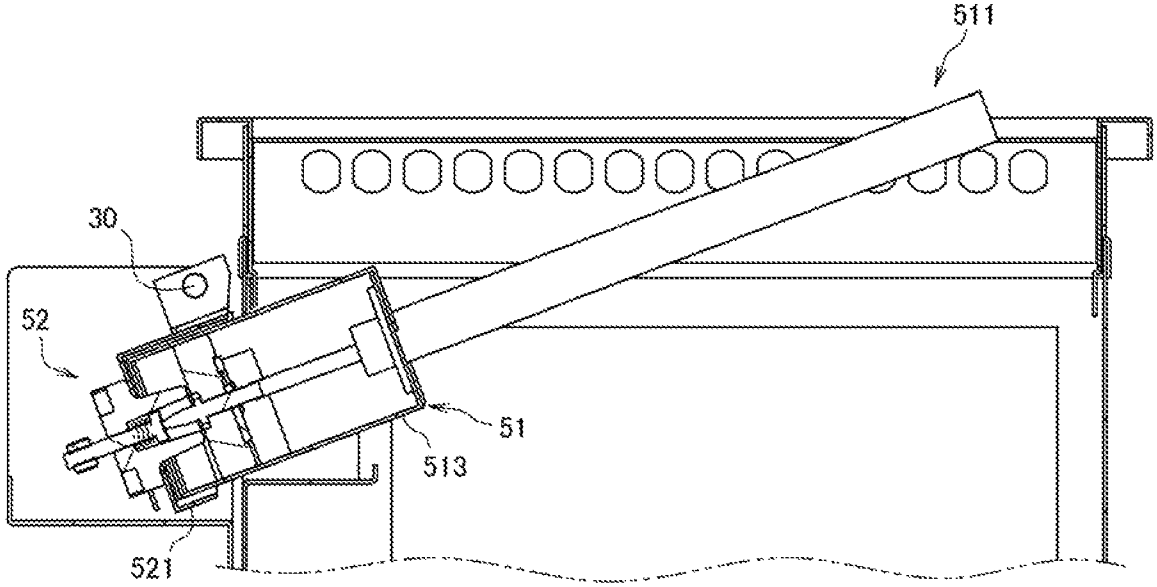

FIG. 14A is a perspective view of the connector unit 52 and the outer casing 1 before the connector unit 52 is installed in the outer casing 1. FIG. 14B is a perspective view of the connector unit 52 and the outer casing 1 after the connector unit 52 is installed in the outer casing 1. FIG. 15A is an assembly perspective view of the connector unit 52. FIG. 15B is an assembly perspective view of the connector unit 52 as viewed from an angle different from that in FIG. 15A. FIG. 15C is a cross-sectional view taken along line XVc-XVc in FIGURE FIG. 16 is a cross-sectional view for explaining a method of detaching the heater unit 51 from the connector unit 52.

In the first embodiment, the connector unit 52 is fixed to the outer casing 1 so as not to move, whereas in the second embodiment, the connector unit 52 is turnably attached to the outer casing 1.

In the heating cooker 100 according to the second embodiment, the structures of the outer casing 1 and the connector unit 52 are different from the structures of the outer casing 1 and the connector unit 52 of the first embodiment. Except for the outer casing 1 and the connector unit 52, the components of the heating cooker 100 according to the second embodiment are the same as the components of the heating cooker 100 according to the first embodiment.

As illustrated in FIGS. 14A and 14B, a connector bracket 20 for supporting the connector unit 52 is attached to the outer surface of the side wall 12A of the outer casing 1. The connector bracket 20 includes a bottom wall 201 and two opposing side walls 202. The bottom wall 201 is provided below the bottom edge of the opening 12*a*. The two side walls 202 extend from the bottom wall 201 to above the upper edge of the opening 12*a*. In each side wall 202, a through hole 202*a* is formed at a position above the upper edge of the opening 12*a*. A shaft member for connecting the connector unit 52 to the connector bracket 20 is inserted into the through hole 202*a*.

As shown in FIGS. 14A to 15C, the connector casing 521 includes a flange 5212. The flange 5212 includes two opposing side walls, and a through hole 5212*a* is formed in each of the side walls.

As illustrated in FIGS. 14A and 14B, the connector casing 521 is attached to the connector bracket 20 by inserting the shaft member 30 into the through hole 5212*a* of the flange 5212 and the through hole 202*a* of the connector bracket 20. The connector unit 52 is attached to the outer casing 1 through the connector bracket 20 so as to be turnable about the shaft member 30.

As illustrated in FIGS. 14A and 14B, the second elastic member 40 is attached to the shaft member 30. The second elastic member 40 is in contact with the outer surface of the side wall 12A of the outer casing 1 and the connector casing 521. The second elastic member biases the connector unit 52 toward the outer casing 1. The second elastic member 40 is, for example, a torsion spring.

In the second embodiment, unlike the first embodiment, the permanent magnet 523 is fixed to the heater casing 513 without using the holding member 524. However, in the second embodiment as well, the permanent magnet 523 may be attached to the holding member 524, and the holding member 524 may be fixed to the heater casing 513, similarly to the first embodiment.

B.2 Method for Detaching Heater Unit

Next, a method for detaching the heater unit 51 from the connector unit 52 will be described with reference to FIG. 16. After the food material placement member 7 and the heater cover 6 are detached, the heater unit 51 is slightly pulled out into the inner casing 3, and the heater unit 51 is tilted such that the distal end of the heater 511 faces upward. The heater unit 51 is twisted upward so as to bend a coupled portion of the heater casing 513 and the connector casing 521 (i.e., the adhered portion of the heater casing 513 and the permanent magnet 523), and the heater unit 51 is detached from the connector unit 52. The heater unit 51 can be detached from the connector unit 52 in such a manner.

B.3 Features

In a case where the magnetic force of the permanent magnet 523 is strong, it may be easier to detach the heater unit 51 from the connector unit 52 by twisting the heater unit 51 upward as described above. Since the connector casing 521 is turnably connected to the outer casing 1 as in the second embodiment, the heater unit 51 can be easily turned obliquely upward, and hence the heater unit 51 can be easily detached from the connector unit 52.

Since the connector casing 521 is biased toward the outer casing 1 by the second elastic member 40, the heater structure 5 does not wobble, and the posture of the heater structure can be maintained.

C. Third Embodiment

A heating cooker 100 and a heater structure 5 according to a third embodiment will be described. Hereinafter, differences from the first embodiment and the second embodiment will be mainly described. Among the components of the third embodiment, the same components as those of the other embodiments are denoted by the same reference numerals, and the description thereof will be omitted.

C.1 Structure of Heater Unit and Reflection Member

Figure 17:
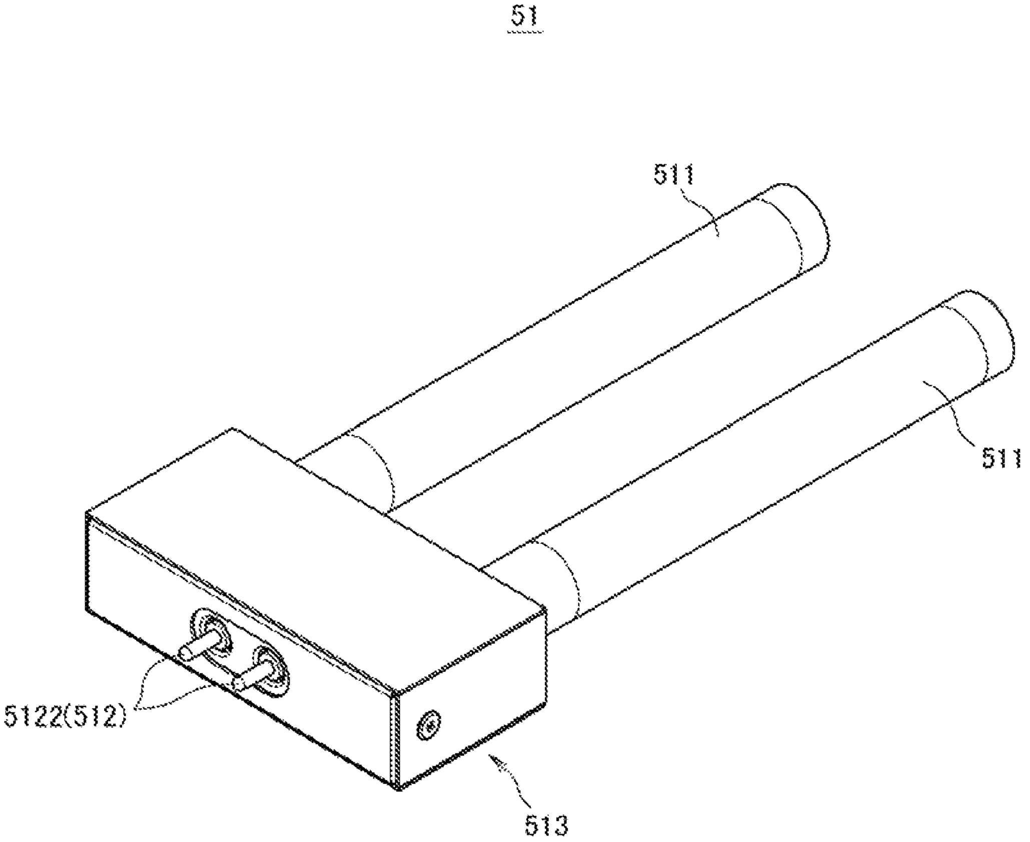
FIGS. 17 to 19 are diagrams illustrating a heater structure and a heating cooker according to a third embodiment of the present invention.
Figure 18:
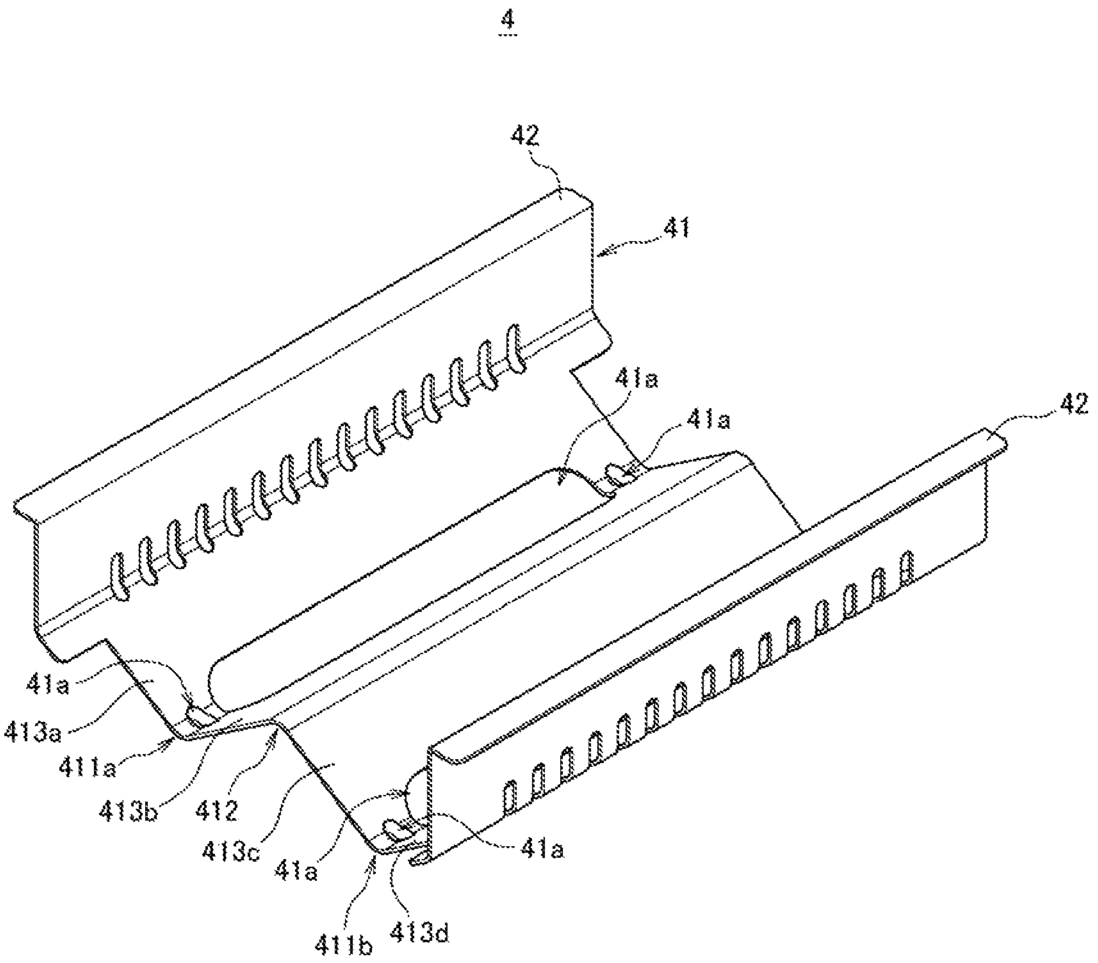
Figure 19:
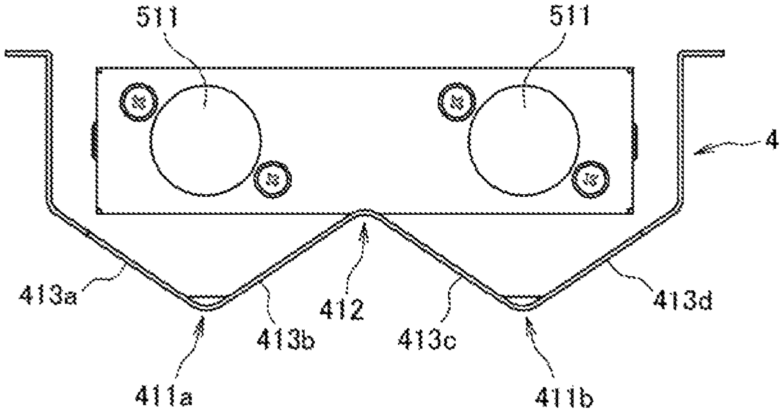

FIG. 17 is a perspective view of the heater unit 51. FIG. 18 is a perspective view of the reflection member 4. FIG. 19 is a side view illustrating a positional relationship between the heater 511 and the reflection member 4.

In heating cooker 100 according to the third embodiment, the structures of the heater unit 51 and the reflection member 4 are different from the structures of the heater unit 51 and the reflection member 4 of the other embodiments. Except for the heater unit 51 and the reflection member 4, the components of the heating cooker 100 according to the third embodiment are the same as the components of the heating cooker 100 according to the first embodiment or the second embodiment.

While the heater unit 51 according to the first embodiment and the second embodiment includes three heaters 511 (see FIG. 3), the heater unit 51 according to the third embodiment includes two heaters 511, as illustrated in FIG. 17.

While the lower part of the reflection member 4 according to the first embodiment and the second embodiment is flat (see FIG. 3), the lower part of the reflection member 4 (main body portion 41) according to the third embodiment has a waveform consisting of irregularities as illustrated in FIGS. 18 and 19.

The lower part of the reflection member 4 includes two trough portions 411*a* and 411*b* separated from each other and a crest portion 412 provided between the two trough portions 411*a* and 411*b*.

Each of the trough portions 411*a* and 411*b* is a portion depressed downward. The trough portion 411*a* is formed by two inclined surfaces 413*a* and 413*b* approaching each other toward the lower side. The trough portion 411*b* is formed by two inclined surfaces 413*c* and 413*d* approaching each other toward the lower side. Each of the trough portions 411*a* and 411*b* are disposed below each heater 511. The bottom of each of the trough portions 411*a*, 411*b* is curved or flat. The bottom of each of the trough portions 411*a*, 411*b* has an opening 41*a*.

The crest portion 412 is a portion that is convex upward. The crest portion 412 is formed by two inclined surfaces 413*b* and 413*c* approaching each other toward the upper side. The apex of the crest portion 412 is curved or flat. The apex of the crest portion 412 is disposed between the two heaters 511 and below the lower ends of the two heaters 511.

The heat radiated downward from heater 511 is reflected toward the food material placement member 7 by each of the inclined surfaces 413*a* to 413*d*.

C.2 Features

When the number of heaters 511 is three, it is contemplated that heat concentrates above the middle heater 511, and the temperature above the middle heater 511 has a possibility of becoming higher than the temperature above the heaters 511 on both sides. When the temperature above the middle heater 511 is higher than the temperature above the other heaters 511, a problem arises in that the food material placed on the center of the food material placement member 7 becomes excessively burnt, while the food material placed at a position away from the center of the food material placement member 7 is hardly burnt. Furthermore, as a result of the food material placed on the center of the food material placement member 7 being excessively burnt, a "bonfire phenomenon" may occur. Note that the "bonfire phenomenon" means a phenomenon in which when a large amount of food material containing a large amount of fat is heated and cooked, the oil of the food material is ignited, so that flame vigorously rises from the food material and the food material placement member 7.

The temperatures above the two heaters 511 can be made more uniform by making the number of heaters 511 two and providing two trough portions 411*a*, 411*b* and one crest portion 412 at the lower part of the reflection member 4. Since the heat reflection efficiency can be improved by the two trough portions 411*a*, 411*b* and the one crest portion 412, the food material can be effectively heated.

D. Modified Example

A modified example of the heating cooker 100 and the heater structure 5 will be described. The modified examples shown below can be appropriately combined without deviating from the gist of the present invention.

(1) The outer casing 1, the inner casing 3, the food material placement member 7, the top cover 8, and the top plate 9 are not limited to a square type, and may be, for example, a round type.

(2) The first terminal 512 may be movable with respect to the first insulator 514, and the second terminal 525 may be immovably fixed with respect to the second insulator 522. The first elastic member 527 may be disposed in the first insulator 514, and may be configured to press the first terminal 512 toward the second terminal 525 by a restoring force when compressed.

(3) The permanent magnet 523 may be disposed on the heater casing 513, and the connector casing 521 may be made of a magnetic material. Alternatively, the permanent magnet 523 may be disposed on both the heater casing 513 and the connector casing 521.

(4) The heater cover 6 is provided as necessary. The heating cooker 100 may not include the heater cover 6. For example, when the durability of the heater 511 is high, such as when the sheath of the heater 511 is increased or when a highly durable material is used for the sheath of the heater 511, the heating cooker 100 may not include the heater cover 6. Since the heating cooker 100 does not include the heater cover 6, heat transfer from the heater 511 to the food material placement member 7 can be improved.

REFERENCE SIGNS LIST

100 heating cooker
1 outer casing

12A side wall
12*a* opening (first opening)
3 inner casing
32*a* opening (second opening)
4 reflection member
411*a*, 411*b* trough portion
412 crest portion
heater structure
51 heater unit
511 heater
512 first terminal
513 heater casing
514 first insulator
52 connector unit
521 connector casing
522 second insulator
5221*a* first through hole
5221*b* second through hole
523 permanent magnet (coupling member)
525 second terminal
5251 first portion
5251*a* first surface (contact surface)
5252 second portion
527 first elastic member
6 heater cover
30 shaft member
40 second elastic member While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A heater unit for a heating cooker, the heater unit comprising:
- at least two first terminals disposed left-right symmetrically;
- a resistance heating type heater electrically connected to the at least two first terminals;
- a heater casing in which the first terminals are disposed;
- a connector unit including a second terminal configured to be electrically connected to a power supply, the second terminal having a contact surface configured to come into contact with the first terminal, and the connector unit being relatively movable with respect to the first terminal, wherein
  - the heater unit and/or the connector unit further includes a coupling member that detachably couples the heater unit and the connector unit, and
  - the heater unit or the connector unit further includes a first elastic member that, when one of the first terminal and the second terminal is pushed by the other terminal, presses the one toward the other, wherein
    - the heater unit further includes a heater casing in which the first terminal is disposed,
    - the connector unit further includes a connector casing capable of being installed in the heating cooker and in which the second terminal is disposed,
    - the coupling member is a permanent magnet disposed in at least one of the heater casing and the connector casing,
    - at least the other of the heater casing and the connector casing is made of a magnetic material, and
    - the heater unit and the connector unit are coupled by the heater casing and the connector casing adhering by magnetic force of the permanent magnet;
- a first insulator disposed in the heater casing, wherein the first terminal is fixed to the first insulator; and
- a second insulator disposed in the connector casing, wherein
  - the second terminal includes a first portion having the contact surface and a second portion integrally formed on a side opposite to the contact surface and having a diameter smaller than a diameter of the first portion,
  - the second insulator includes a first through hole into which the first portion is insertable and a second through hole having a diameter smaller than a diameter of the first portion and into which the second portion is insertable,
  - the first portion is disposed in the first through hole, and the second portion extends through the first through hole and the second through hole,
  - the first elastic member is disposed in the first through hole and between the first portion and a wall portion of the second insulator, and
  - when the second terminal is pushed in by the first terminal, the first elastic member is compressed between the first portion and the wall portion of the second insulator, and the second terminal is pressed toward the first terminal by a restoring force of the compressed first elastic member.

2. The heater unit of claim 1, wherein a shape of the heater is a rod shape.

3. The heater unit of claim 2, wherein the shape of the heater is a circular column shape.

4. The heater unit of claim 1, wherein a top view and a bottom view of the heater unit are the same.

5. The heater unit of claim 1, wherein
- the contact surface is a concave curved surface, and
- a portion of the first terminal that comes into contact with the contact surface is smaller than the contact surface.

6. The heater unit of claim 1, wherein the heater unit is capable of being inverted upside down and coupled to the connector unit.

7. A heating cooker comprising the heater unit of claim 1.

8. The heating cooker according to claim 7, comprising:
- an outer casing; and
- an inner casing accommodated in the outer casing, wherein
  - the outer casing includes a side wall having a first opening,
  - the inner casing includes a side wall having a second opening at a position facing the first opening,
  - the connector unit is immovably fixed to an outer surface of the side wall of the outer casing,
  - the contact surface of the second terminal is exposed through the first opening and the second opening, and
  - the heater unit is inserted into the first opening and the second opening from an inside of the inner casing, and is coupled to the connector unit.

9. The heating cooker according to claim 7, comprising:
- an outer casing;
- an inner casing accommodated in the outer casing; and
- a shaft member, wherein
  - the outer casing includes a side wall having a first opening, the inner casing includes a side wall having a second opening at a position facing the first opening, the coupling member is a permanent magnet disposed in at least one of the heater casing and the connector casing, at least the other of the heater casing and the connector casing is made of a magnetic material, the heater unit and the connector unit are coupled by the heater casing and the connector casing adhering by a magnetic force of the permanent magnet, the connector unit is turnably connected to an outer surface of the side wall of the outer casing by the shaft member, the contact surface of the second terminal is exposed through the first opening and the second opening, and the heater unit is inserted into the first opening and the second opening from an inside of the inner casing, and is coupled to the connector unit.

10. The heating cooker according to claim 9, further comprising a second elastic member that biases the connector unit toward the outer casing.

11. The heating cooker according to claim 7, further comprising a reflection member that reflects heat radiated from the heater, where at least a part of the reflection member is disposed below the heater.

12. The heating cooker according to claim 11, wherein the heater unit includes two heaters separated from each other, and the reflection member includes two trough portions disposed below the two heaters, respectively, and a crest portion provided between the two trough portions.

13. The heating cooker according to claim 7, further comprising a heater cover that prevents adhesion of dirt to the heater unit.

* * * * *